(12) United States Patent
Ohara et al.

(10) Patent No.: US 11,220,047 B2
(45) Date of Patent: Jan. 11, 2022

(54) SHAPING DEVICE AND SHAPING METHOD

(71) Applicant: MIMAKI ENGINEERING CO., LTD., Nagano (JP)

(72) Inventors: Eiichi Ohara, Nagano (JP); Akira Takeuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 349 days.

(21) Appl. No.: 15/611,796

(22) Filed: Jun. 2, 2017

(65) Prior Publication Data
US 2017/0348902 A1 Dec. 7, 2017

(51) Int. Cl.
| | |
|---|---|
| *B29C 64/20* | (2017.01) |
| *B33Y 30/00* | (2015.01) |
| *B29C 64/209* | (2017.01) |
| *B29C 64/241* | (2017.01) |
| *B29C 64/245* | (2017.01) |
| *B33Y 10/00* | (2015.01) |
| *B29C 64/112* | (2017.01) |
| *B33Y 50/02* | (2015.01) |

(Continued)

(52) U.S. Cl.
CPC ............. *B29C 64/20* (2017.08); *B29C 64/209* (2017.08); *B29C 64/241* (2017.08); *B29C 64/245* (2017.08); *B33Y 30/00* (2014.12); *B29C 35/0805* (2013.01); *B29C 64/112* (2017.08); *B29C 64/393* (2017.08); *B29C 2035/0827* (2013.01); *B33Y 10/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 9,592,635 B2 * | 3/2017 | Ebert | ............... B29C 64/00 |
| 9,751,259 B2 * | 9/2017 | Donaldson | ........... B33Y 30/00 |
| 10,226,894 B2 * | 3/2019 | Houben | ............... B22F 3/24 |

(Continued)

FOREIGN PATENT DOCUMENTS

| | | |
|---|---|---|
| JP | 2001162687 | 6/2001 |
| JP | 2005059477 | 3/2005 |

(Continued)

OTHER PUBLICATIONS

"Office Action of Japan Counterpart Application", dated Mar. 12, 2019, with English translation thereof, p. 1-p. 9.

*Primary Examiner* — Benjamin A Schiffman
(74) *Attorney, Agent, or Firm* — JCIPRNET

(57) ABSTRACT

To efficiently and appropriately shape a 3D object. There is provided a shaping device that shapes a three-dimensional (3D) object through a layering shaping method, the shaping device including an inkjet head, which is a discharging head, that discharges a material liquid droplet, a liquid droplet of a material for the 3D object; and a circling driving section that relatively circles at least a region to be discharged, which is a region to which the material liquid droplet is discharged in the 3D object being shaped, along a circling path set in advance with respect to the inkjet head; where the circling driving section causes the region to be discharged to circle the circling path plural times; and inkjet head discharges the material liquid droplet onto the region to be discharged circling on the circling path.

10 Claims, 12 Drawing Sheets

(51) Int. Cl.
*B29C 64/393* (2017.01)
*B29C 35/08* (2006.01)

(56) References Cited

U.S. PATENT DOCUMENTS

| | | |
|---|---|---|
| 2012/0165969 A1 | 6/2012 | Elsey |
| 2016/0096319 A1* | 4/2016 | Donaldson ............. B33Y 30/00 264/40.7 |
| 2017/0100898 A1* | 4/2017 | Cofler .................... B33Y 10/00 |

FOREIGN PATENT DOCUMENTS

| | | |
|---|---|---|
| JP | 2007503342 | 2/2007 |
| JP | 2015522450 | 8/2015 |
| JP | 2015536845 | 12/2015 |
| JP | 2016074205 | 5/2016 |
| WO | 2015177598 | 11/2015 |

\* cited by examiner

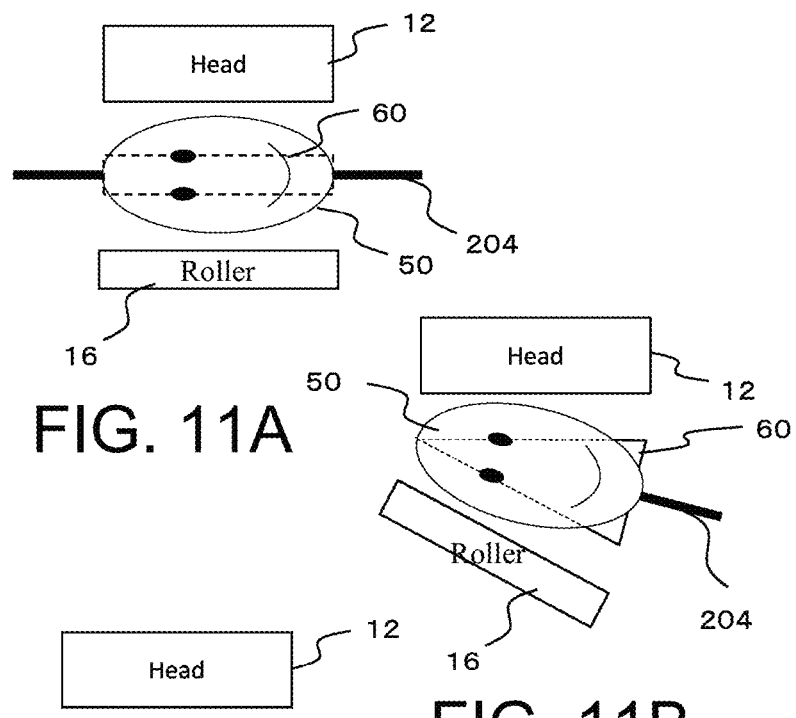
FIG. 11A
FIG. 11B
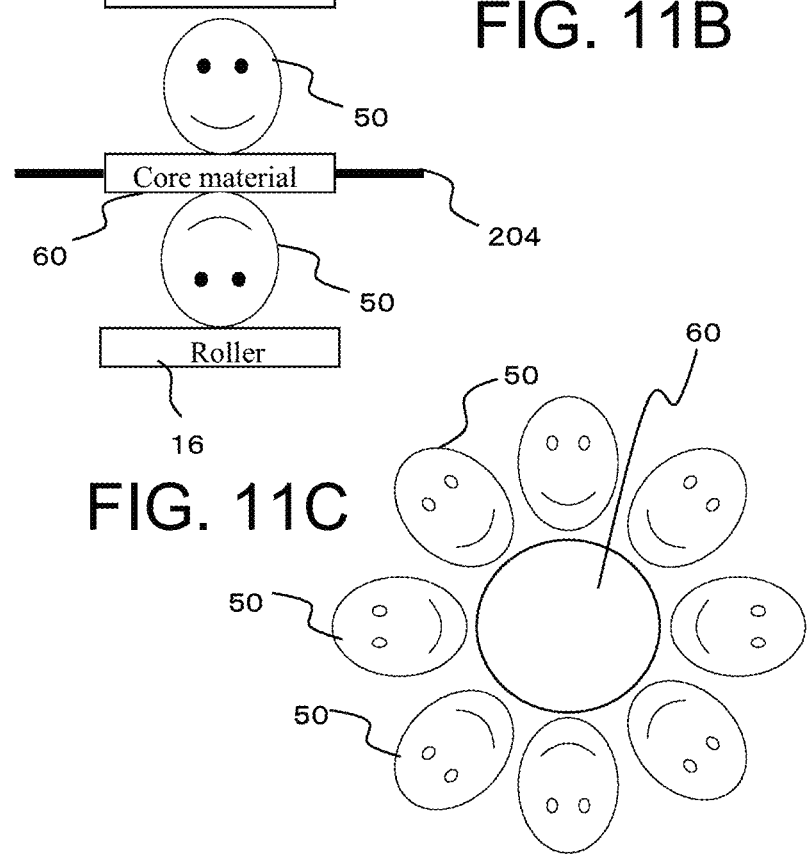
FIG. 11C
FIG. 11D

SHAPING DEVICE AND SHAPING METHOD

CROSS REFERENCE TO RELATED APPLICATIONS

This application claims the priority benefit of Japanese Patent Application No, 2016-111020 filed on Jun. 2, 2016. The entirety of the above-mentioned patent application is hereby incorporated by reference herein and made a part of this specification.

TECHNICAL FIELD

The present disclosure relates to a shaping device and a shaping method.

DESCRIPTION OF THE BACKGROUND ART

Conventionally, an inkjet printer that carries out printing through an inkjet method is widely used (see e.g., Internet URL http://www.mimaki.co.jp). In recent years, a method (inkjet shaping method) carried out using an inkjet head has been considered for a configuration of a shaping device (3D printer) that shapes a three-dimensional (3D) object (three-dimensional object). In this case, for example, a 3D object is shaped through a layering shaping method by overlapping a plurality of ink layers formed by the inkjet head.

SUMMARY

When shaping the 3D object through the layering shaping method, a great number of ink layers needs to be shaped, and hence a great amount of time is required for shaping. On the contrary, with the spread of application of the 3D printer and the like in recent years, a configuration capable of more efficiently carrying out the shaping is desired. The present disclosure thus provides a shaping device and a shaping method capable of solving the problem described above.

When shaping a 3D object through the layering shaping method using an inkjet head, a method of causing the inkjet head to carry out a main scanning operation, similar to a conventional inkjet printer, for example, is being reviewed as a specific method. However, when forming an ink layer constituting the 3D object with the main scanning operation, the moving distance of the inkjet head becomes long with respect to a width of the 3D object, and the inkjet head may not be efficiently used. As a result, the efficiency of shaping may lower.

More specifically, for example, the main scanning operation is carried out with respect to a range set in accordance with the width of a print medium (medium) such as paper not at the time of shaping the 3D object but when printing a two-dimensional image. In this case, the inkjet head can be efficiently used as the width of the region to which the ink droplet is to be discharged by the inkjet head during the main scanning operation is usually sufficiently wide.

At the time of shaping of the 3D object, on the other hand, a 3D object having a small width as compared to a typical print medium is often shaped. In this case, the width of the region to which the ink droplet is to be discharged by the inkjet head becomes small as compared to the time of printing of the two-dimensional image.

On the contrary, when causing the inkjet head to carry out the main scanning operation, the moving speed at the time of discharge of the ink droplet needs to be made constant. Thus, in this case, a section for carrying out acceleration and deceleration becomes necessary before and after starting the discharge of the ink droplet. Thus, when causing the inkjet head to carry out the main scanning operation, if the width of the region to which the ink droplet is to be discharged by the inkjet head becomes small, a proportion of the distance where the inkjet head moves at the time of acceleration/deceleration becomes large in the moving distance of the inkjet head during the main scanning. As a result, the time when the inkjet head is not operating becomes long, and a usage efficiency of the inkjet head lowers.

When carrying out shaping through the layering shaping method, a great number of ink layers needs to be overlapped and formed. In this case, the main scanning operation needs to be repeatedly carried out a great number of times. Thus, when the usage efficiency of the inkjet head lowers in the main scanning operation, the efficiency of the shaping greatly lowers.

After thorough research, the inventor of the present application contrived relatively circling the 3D object being shaped along a circling path with respect to the inkjet head rather than a method of repeating the main scanning operation. According to such configuration, for example, the ink layers can be overlapped and formed by discharging the ink droplet with the inkjet head every time the 3D object is circled. Furthermore, in such a case, the acceleration/deceleration and the like in the main scanning operation become unnecessary, whereby the usage efficiency of the inkjet head can be appropriately enhanced. Thus, according to such configuration, for example, the 3D object can be more efficiently shaped.

Through further thorough research, the inventor of the present application found a configuration of the present disclosure for obtaining the effects described above. In order to solve the problem described above, the present disclosure provides a shaping device that shapes a three-dimensional (3D) object through a layering shaping method, the shaping device including a discharging head that discharges a material liquid droplet, a liquid droplet of a material for the 3D object; and a circling driving section that relatively circles at least a region to be discharged, a region to which the material liquid droplet is discharged in the 3D object being shaped, along a circling path set in advance with respect to the discharging head, where the circling driving section causes the region to be discharged to circle the circling path plural times, and the discharging head discharges the material liquid droplet onto the region to be discharged circling on the circling path.

In this configuration, the region to be discharged is a surface to be shaped where a next layer is formed in the 3D object. The region to be discharged may be a top surface of the 3D object being shaped. In this case, the top surface is, for example, a surface on a side closest to the discharging head. Furthermore, in this configuration, circling the region to be discharged along the circling path means, for example, circling the 3D object being shaped along the circling path. Moreover, a method of rotating the 3D object being shaped with a predetermined shaft as a center, and the like, for example, is also considered as a method of circling the region to be discharged along the circling path.

An inkjet head and the like that discharges the material liquid droplet through the inkjet method, for example, can be suitably used for the discharging head. Furthermore, liquid droplet of ultraviolet curing type resin, and the like, for example, can be suitably used for the material liquid droplet. An ultraviolet curing type ink, and the like, for example, can be suitably used for the ultraviolet curing type resin.

The discharging head, for example, discharges the material liquid droplet onto the region to be discharged at a timing when the region to be discharged passes a position set in advance on the circling path. In this case, the discharging head, for example, may discharge the material liquid droplet to the region to be discharged every time the region to be discharged circles on the circling path a number of times set in advance. Furthermore, the discharging head, for example, preferably discharges the material liquid droplet to the region to be discharged every time the region to be discharged makes one round on the circling path.

According to such configuration, for example, the 3D object can be appropriately shaped through the layering shaping method by repeatedly discharging the material liquid droplet with the discharging head onto the region to be discharged circling along the circling path. In this case, the usage efficiency of the discharging head does not lower as in the case where the main scanning operation is carried out since the discharging head does not need to carry out the main scanning operation. Thus, according to such configuration, for example, the 3D object can be efficiently and appropriately shaped.

Use of a shaping method having features similar to the above is also considered for the configuration of the present disclosure. In this case as well, for example, effects similar to the above can be obtained.

Effects of the Disclosure

According to present disclosure, for example, the 3D object can be efficiently and appropriately shaped.

BRIEF DESCRIPTION OF THE DRAWINGS

FIG. 1A is a top view showing one example of a configuration of a main section of the shaping device 10. FIG. 1B shows one example of a configuration of an inkjet head 12 in the shaping device 10.

FIG. 2A is a perspective view showing a configuration of a main section of the shaping apparatus 10. FIG. 2B is a view describing a timing, and the like of carrying out shaping with respect to a 3D object 50 on a rotating table 30.

FIG. 4A is a top view showing one example of a configuration of a main section of the shaping device 10. FIG. 4B is a view describing the operation of the shaping device 10.

FIG. 5A shows one example of a configuration of a main section of the shaping device 10. FIG. 5B is a view describing an operation of the shaping device 10. FIG. 5C is a view describing a relative position relationship of a nozzle row 102 of the inkjet head 12 and the 3D object 50 being shaped.

FIG. 6A shows one example of a configuration of a main section of the shaping device 10. FIG. 6B shows one example of a state of moving the 3D object 50 along the circling path. FIG. 6C shows one example of a configuration in a case where the 3D object 50 is held using a 3D object holding section 40.

FIG. 7A is a perspective view showing one example of a configuration of a main section of the shaping device 10. FIGS. 7B and 7C are views describing a driving method of driving each section of the shaping device 10.

FIG. 8A shows one example of an operation of shaping carried out when the diameter of the 3D object 50 is small. FIG. 8B shows one example of an operation of shaping carried out when the diameter of the 3D object 50 is large.

FIG. 9A shows an example of an operation of carrying out shaping of the end face when using a triangular pyramid shaped core material 60. FIG. 9B shows an example of an operation of carrying out shaping of the end face when using the core material 60 having a shape in which two bottom surfaces of two triangular pyramid shapes are combined.

FIGS. 10A to 10D show, in order, an operation sequentially carried out to carry out the shaping of the end face when using a circular plate shaped core material 60.

FIGS. 11A to 11D are views describing a method for shaping the face of the figure. FIGS. 11A to 11D show an example of a method for shaping the face of the figure.

DETAILED DESCRIPTION OF EMBODIMENTS

Figure 1A:
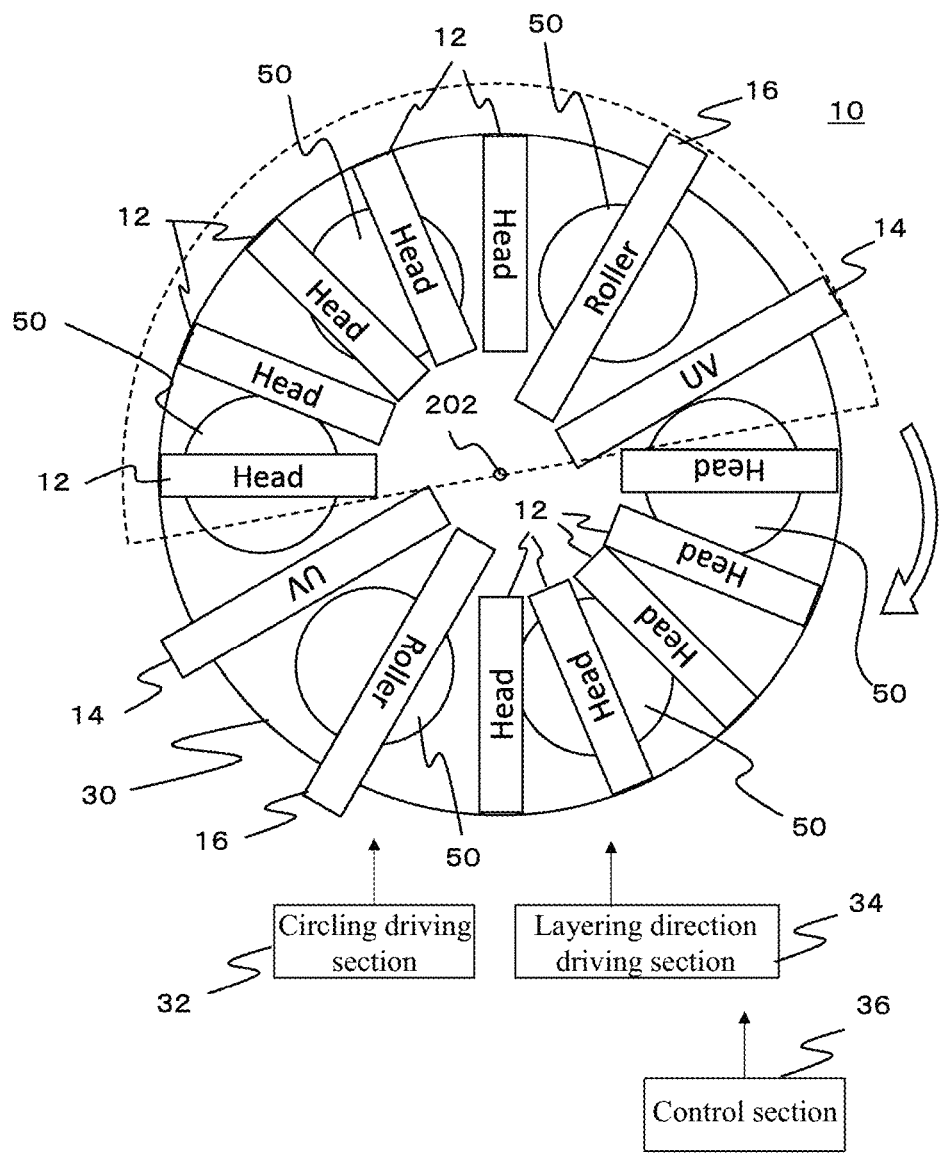
FIGS. 1A and 1B are views showing one example of a configuration of a shaping device 10 according to one embodiment of the present disclosure.
Figure 1B:
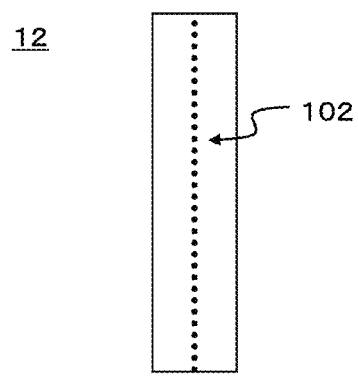

Hereinafter, an embodiment according to the present disclosure will be described with reference to the drawings. FIGS. 1A and 1B show one example of a configuration of a shaping device 10 according to one embodiment of the present disclosure. FIG. 1A is a top view showing one example of a configuration of a main section of the shaping device 10. FIG. 1B shows one example of a configuration of an inkjet head 12 in the shaping device 10.

In the present example, the shaping device 10 is a shaping device that shapes a three-dimensional (3D) object 50 through a layering shaping method using the inkjet head 12. In this case, the layering shaping method is, for example, a method of carrying out shaping by overlapping and forming a plurality of layers of a material for shaping. More specifically, the shaping device 10 is a forming device (turn table type 3D shaping machine) that carries out shaping with the 3D object 50 placed on a rotating table 30, and includes the rotating table 30, the plurality of inkjet heads 12, a plurality of ultraviolet light sources 14, a plurality of rollers 16, a circling driving section 32, a layering direction driving section 34, and a control section 36.

Other than the aspects described above and below, the shaping device 10 of the present example may have the same or similar characteristics as a conventional shaping device. For example, other than the illustrated configuration, the shaping device 10 of the present example may further have various types of configurations and the like required for shaping similar to the conventional shaping device.

Furthermore, the 3D object 50 being shaped will be hereinafter simply referred to as a 3D object 50 in a partial explanation for the sake of convenience of explanation. Moreover, in the shaping device 10 of the present example, a predetermined number of the inkjet heads 12, the ultraviolet light sources 14, and the rollers 16 is handled as one shaping unit. More specifically, in the configuration illustrated in FIG. 1A, one shaping unit is a portion surrounded with a broken line in the figure, and is configured by five inkjet heads 12, one roller 16, and one ultraviolet light source 14. In this case, the inkjet head 12, the ultraviolet light source 14, and the roller 16 in the portion not surrounded with the broken line configure another shaping unit. Thus, in this configuration, the shaping device 10 has two shaping units.

The number of shaping units in the shaping device 10 is not particularly limited. Thus, the number can be appropriately changed according to the specification demanded on the shaping device 10, the size of the shaping device 10, and the like. Furthermore, the number of inkjet heads 12, ultraviolet light sources 14, and rollers 16 in each shaping unit can be appropriately changed. For example, the ultraviolet light source 14 may be arranged between the inkjet heads 12, so that a plurality of ultraviolet light sources 14 may be arranged in each shaping unit.

Each configuration of the shaping device 10 will be described below. The rotating table 30 is a platform shaped member (turn table) that supports the 3D object 50 being shaped. In the present example, the rotating table 30 serves as one example of a platform that can rotate with a predetermined platform rotating shaft as the center, and is mounted so as to be rotatable with a rotating shaft 202, serving as one example of the platform rotating shaft, as the center. The rotating shaft 202 is a shaft parallel to the layering direction, which is a direction in which the material for shaping is layered in the 3D object 50 being shaped.

Furthermore, in the present example, the rotating table 30 is a platform shaped member having a circular top surface. The 3D object 50 being shaped is mounted in plurals on the rotating table 30 so as to be lined along a circumferential direction with the positions in the radial direction of the rotating table 30 aligned. The plurality of 3D objects 50 being shaped circle around the rotating shaft 202 according to the rotation of the rotating table 30. In this case, more specifically, the 3D object 50 circles on a circling path along the circling path set to a circumferential shape with the rotating shaft 202 as the center.

When referring to aligning the positions of the 3D object 50 in the radial direction of the rotating table 30, for example, this means aligning a distance from the rotating shaft 202 for a reference position in the respective 3D objects 50. The reference position in the 3D object 50 is, for example, a position that becomes a reference of the shaping operation of the respective 3D objects 50. Furthermore, in the present example, the rotating table 30 is rotated in a direction indicated with an arrow in the figure when driven by the circling driving section 32.

The plurality of inkjet heads 12 serve as one example of a discharging head that discharges a material liquid droplet, which is a liquid droplet of the material of the 3D object 50, through the inkjet method. In the present example, each of the plurality of inkjet heads 12 discharges an ink droplet of an ultraviolet curing type ink for the material liquid droplet. In this case, the ultraviolet curing type ink is an example of an ultraviolet curing type resin that is cured when irradiated with an ultraviolet ray. The ultraviolet curing type ink may be an ink containing the ultraviolet curing type resin. Furthermore, in this case, the ink is, for example, liquid discharged through the inkjet method. Moreover, in the present example, each inkjet head 12 includes a nozzle row 102 in which a plurality of nozzles, each discharging a material liquid droplet, are lined, as shown in FIG. 1B. In the nozzle row, the plurality of nozzles are, for example, lined in a nozzle row direction set in advance in the inkjet head 12, as shown in the figure.

The plurality of inkjet heads 12 are arranged at positions facing the top surface of the rotating table 30, and discharge the material liquid droplet with respect to the 3D objects 50 circling along the circling path according to the rotation of the rotating table 30. In this case, the respective inkjet heads 12 discharge the material liquid droplet onto the top surface of the 3D object being shaped at a timing when the 3D object 50 being shaped passes thereunder. Thus, the respective inkjet heads 12 discharge the material liquid droplet onto the top surface of the 3D object 50 every time the 3D object 50 makes one round on the circling path.

The top surface of the 3D object 50 is, for example, a surface on a side closest to the inkjet head 12. Furthermore, in the present example, the top surface of the 3D object 50 is a region to be discharged, which is a region to which the material liquid droplet is discharged in the 3D object 50 being shaped. The region to be discharged of the 3D object 50 is, for example, a surface to be shaped where a next layer is formed in the 3D object 50.

Each of the plurality of inkjet heads 12 is arranged at a position different from each other in the circling path of the 3D object 50, and respectively discharges the material liquid droplet to the region to be discharged of the 3D object 50 at the different positions. More specifically, in the present example, the plurality of inkjet heads 12 in each shaping unit are arranged so as to be lined in the circumferential direction of the rotating table 30 with the respective nozzle row direction directed in a direction parallel to the radial direction of the rotating table 30. Thus, the plurality of inkjet heads 12 in each shaping unit discharge the material liquid droplet in order with respect to the 3D object 50 moving along the circling path. In this case, the plurality of inkjet heads 12 form each layer of the material for shaping by, for example, an operation of one path of carrying out one discharge of the material liquid droplet per one round of the 3D object 50 with respect to each position of the region to be discharged.

The plurality of inkjet heads 12 may discharge the material liquid droplet of different types from each other. In this case, consideration is made to discharge a model material (model agent), support material (support agent), coloring material (color ink), and the like with the respective inkjet heads 12. Furthermore, the material for shaping may be, for example, a material same as or similar to the material used in a known shaping device. According to such configuration, for example, the liquid droplets of various types of materials required for shaping can be appropriately discharged.

The ultraviolet light source 14 is a light source that emits an ultraviolet ray, and is arranged at an ultraviolet ray irradiating position set in advance in the circling path of the 3D object 50 to irradiate the 3D object 50 with the ultraviolet ray at a timing when the 3D object 50 passes the ultraviolet ray irradiating position. Furthermore, the ultraviolet light source 14 thereby cures the uncured shaping material in the 3D object 50 being shaped.

In the present example, the ultraviolet light source 14 of the respective shaping units is arranged closer to the downstream side in the circling path of the 3D object 50 than the inkjet head 12 in the same shaping unit. The ultraviolet light source 14 thus irradiates the 3D object 50 with the ultraviolet ray after the material liquid droplet is discharged from the inkjet head 12 in the same shaping unit. In this case, irradiating the 3D object 50 with the ultraviolet ray may be, for example, irradiating the region to be discharged of the 3D object 50 with the ultraviolet ray.

The roller 16 serves as one example of a planarizing means, and is arranged at a planarizing position set in advance in the circling path of the 3D object 50 to carry out planarizing of the layer of the material for shaping at a timing when the 3D object 50 passes the planarizing position. In this case, the roller 16 planarizes the layer of the material for shaping being formed on the top surface of the 3D object 50 by, for example, rotating in a predetermined direction while making contact with the top surface of the 3D object 50 being shaped. The roller 16 thereby adjusts the thickness of the layer of the material for shaping to a predetermined thickness set in advance.

In the present example, the roller 16 of the respective shaping units is arranged between the plurality of inkjet heads 12 and the ultraviolet light sources 14 in the circling path of the 3D object 50. The roller 16 thereby planarizes the layer of the material for shaping formed by the inkjet head 12 in the same shaping unit before being irradiated with the ultraviolet ray by the ultraviolet light source 14.

The circling driving section 32 is a driving section that rotates the rotating table 30 with the rotating shaft 202 as the center. In the present example, the circling driving section 32 is configured, for example, from a motor, an encoder, and the like, and rotates the rotating table 30 in the predetermined direction to circle the plurality of 3D objects 50 mounted on the rotating table 30 along the circumferential shaped circling path having the rotating shaft 202 as the center. In this case, the circling driving section 32 rotates the rotating table 30 plural times according to the number of layers of the material to be layered in the 3D object 50.

In a more generalized manner, the operation of the circling driving section 32 can be considered as an operation of relatively circling at least the region to be discharged of the 3D object 50 being shaped along the circling path with respect to the inkjet head 12. In this case, the circling driving section 32, for example, circles the region to be discharged of the 3D object 50 plural times on the circling path. As described above, in the present example, the inkjet head 12 discharges the material liquid droplet onto the top surface of the 3D object 50 every time the 3D object 50 makes one round in the circling path. With regards to this as well, however, in a more generalized manner, the operation of the inkjet head 12 is not limited for every round and the material liquid droplet may be discharged for every plural circling. In other words, the inkjet head 12, for example, may discharge the material liquid droplet to the region to be discharged every time the region to be discharged circles on the circling path a number of times set in advance.

The layering direction driving section 34 is a driving section that relatively moves each component of the shaping unit with respect to the layering direction of the material for shaping, and adjusts the position of each component of the shaping unit according to the height in which the layer of the material is layered in the 3D object 50 being shaped. In this case, for example, consideration is made to relatively move each component of the shaping unit with respect to the 3D object 50 in a direction of moving away from the 3D object 50 according to the height in which the layer of the material is layered. More specifically, in the present example, the layering direction driving section 34 moves the inkjet head 12, the ultraviolet light source 14, and the roller 16 in the shaping unit in a direction of moving away from the rotating table 30 according to the progress in the operation of shaping. According to such configuration, the inkjet head 12, the ultraviolet light source 14, and the roller 16 can be appropriately moved to positions corresponding to the height of the 3D object 50 being shaped. The shaping by the layering shaping method, for example, thus can be appropriately carried out.

The control section 36 is, for example, a CPU of the shaping device 10, and controls the operation of each section of the shaping device 10. More specifically, in the present example, the control section 36 controls the operations of the inkjet head 12, the ultraviolet light source 14, and the roller 16 to cause each section of the shaping unit to form the layer of the material for shaping. Furthermore, the rotating table 30 is rotated by controlling the operation of the circling driving section 32. Moreover, the position of the shaping unit in the layering direction is adjusted by controlling the operation of the layering direction driving section 34. Such controls are carried out according to the position of the 3D object 50 in the circling path.

According to the present example, for example, the layer of the material for shaping can be appropriately layered by repeatedly discharging the material liquid droplet with the inkjet head 12 onto the region to be discharged of the 3D object 50 circling along the circling path. Furthermore, a layer having a thickness set in advance can be formed at high accuracy for each layer of the material for shaping by carrying out planarizing with the roller 16 in the circling path. Moreover, each layer of the material for shaping can be appropriately cured by being irradiated with the ultraviolet ray with the ultraviolet light source 14 in the circling path. Thus, according to the present example, for example, the 3D object can be appropriately shaped through the layering shaping method.

Figure 2A:
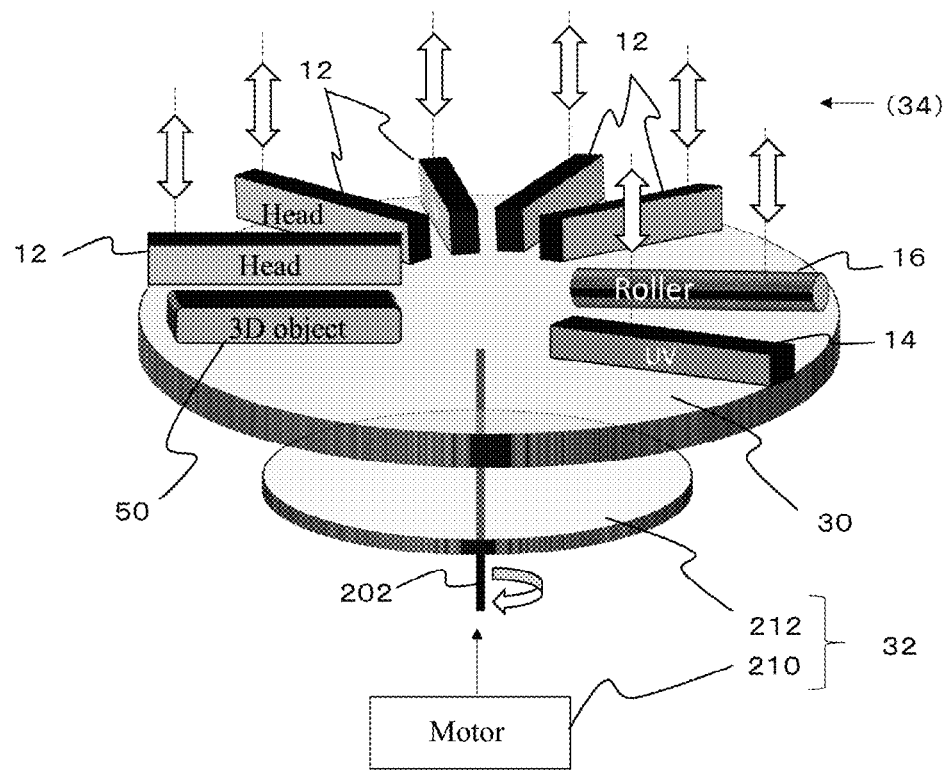
FIGS. 2A and 2B are views showing one example of a driving method of driving each section of the shaping device 10.
Figure 2B:
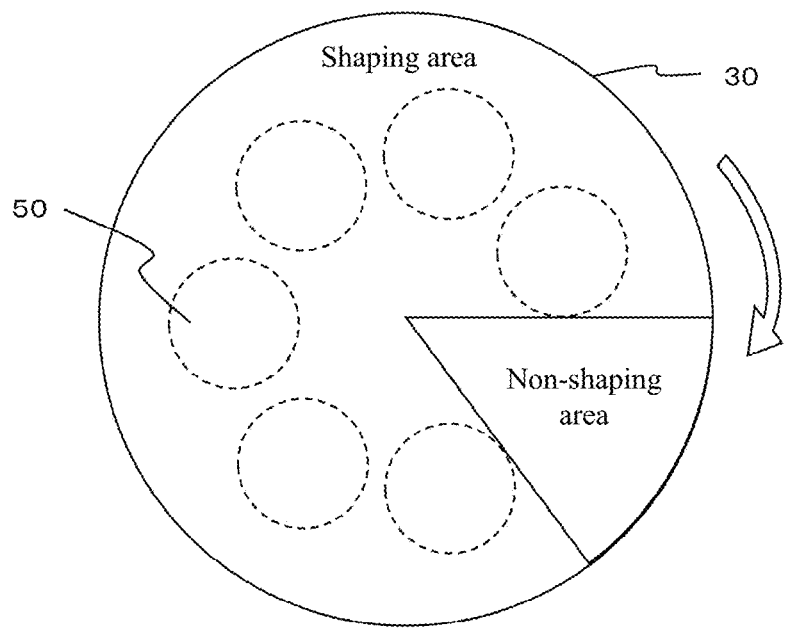

Next, a driving method of driving each section of the shaping device 10 in the present example and the like will be described in more detail. FIGS. 2A and 2B show one example of a driving method of driving each section of the shaping device 10. FIG. 2A is a perspective view showing a configuration of a main section of the shaping device 10. FIG. 2B is a view describing a timing, and the like of carrying out shaping with respect to the 3D object 50 on the rotating table 30.

In FIGS. 2A and 2B, some characteristics are illustrated in a manner different from FIGS. 1A and 1B for the sake of convenience of illustration and explanation. More specifically, in FIG. 2A, only each component (inkjet head 12, ultraviolet light source 14, and roller 16) of one shaping unit surrounded with a broken line of the shaping units in the configuration shown in FIG. 1A is shown. Furthermore, a region of arranging each component of the shaping unit is illustrated in a manner wider than FIG. 1A. In FIG. 2B, a non-shaping area, to be described later, is shown in a manner wider than FIG. 1A.

As described above, in the present example, the circling driving section 32 rotates the rotating table 30 with the rotating shaft 202 as the center. More specifically, the circling driving section 32 includes, for example, a motor 210 and an encoder 212. The motor 210 is, for example, a power source such as a linear motor, and generates power for rotating the rotating table 30 with the rotating shaft 202 as the center. In the present example, the motor 210 continues to rotate at a constant speed without stopping during the operation of shaping. The motor 210 thus rotates the rotating table 30 at a constant speed during the operation of shaping.

The encoder 212 has a component for detecting the rotation amount of the rotating table 30. In the present example, the control section 36 (see FIGS. 1A and 1B) detects the rotation amount of the rotating table 30 based on a state of the encoder 212. The control section 36 thus detects the position of each 3D object 50 in the circling path, and controls each section of the shaping device 10 according to the position of each 3D object 50.

As described above, in the present example, the layering direction driving section 34 moves each component (inkjet head 12, ultraviolet light source 14, and roller 16) of the shaping unit in the layering direction according to the progress of shaping. In this case, the layering direction driving section 34, for example, preferably moves each component using the power of the linear motor, and the like. According to such configuration, for example, each component of the shaping unit can be appropriately moved with high accuracy. In this case, the layering direction driving section 34, for example, moves each component of the shaping unit at a timing corresponding to an edge (encoder edge) of the encoder 212. The edge of the encoder 212 is, for example, a reference position set in advance in the encoder 212.

The layering direction driving section 34 may, for example, drive the inkjet head 12, the ultraviolet light source 14, and the roller 16 in the shaping device 10 in units of modules set in advance. In this case, the module is, for example, a group of components having the same function in a set of shaping units. More specifically, in the illustrated configuration, one set of shaping units includes a module configured from a plurality of inkjet heads 12, a module configured from the roller 16, and a module configured from the ultraviolet light source 14. The layering direction driving section 34 may, for example, drive each component in units of shaping units. In this case, driving in units of modules or in units of shaping units means, for example, simultaneously moving the component included in the module or the shaping unit in the layering direction.

The movement of each component by the layering direction driving section 34 is preferably carried out at a timing when each component is not carrying out the operation necessary for shaping. More specifically, for example, the movement of the inkjet head 12 is preferably carried out other than during the discharge of the material liquid droplet by the inkjet head 12. The movement of the ultraviolet light source 14 and the roller 16 is preferably carried out at a timing when the irradiation of the ultraviolet ray by the ultraviolet light source 14 and the planarizing by the roller 16 are not being carried out with respect to the 3D object 50.

In the present example, for example, a region of one part of the rotating table 30 is set as a non-shaping area, and the shaping of the 3D object 50 is carried out on a shaping area, which is a region other than the non-shaping area, as shown in FIG. 2B. In this case, the non-shaping area is set as a region for creating a timing of moving each component of the shaping unit in the layering direction (Z direction), the region being on a back side of the 3D object 50 in the rotating direction of the rotating table. The shaping area is thus moved in the rotating direction with the 3D object 50 being shaped according to the rotation of the rotating table 30.

In this case, the 3D object 50 is shaped on the shaping area other than the non-shaping area, as described above, on the rotating table 30. Thus, each component of the shaping unit becomes a non-operating state, in which the operation necessary for shaping is not carried out, at a timing of facing the non-shaping area. In this case, each component can be appropriately moved at a timing not included in the operation of shaping by moving the component of the shaping unit in the layering direction at a timing when each component of the shaping unit faces the non-shaping area. Furthermore, for example, each component of the shaping unit can be thus appropriately moved in the layering direction while preventing influence on the operation of shaping. In this case, more specifically, for example, an inter-layer movement of moving each component of the shaping unit between the shaping timings of respective layers formed through the layering shaping method can be appropriately carried out. Thus, according to the present example, for example, the operation of shaping using the rotating table 30 can be more appropriately carried out.

As described above, the inkjet head 12 and the like become non-driven at a timing of facing the non-shaping area. Thus, it is preferable to narrow the non-shaping area to more efficiently use the inkjet head 12 and the like. The drive of each component by the layering direction driving section 34 is not limited to a specific timing, and can be appropriately set as long as a plurality of layers can be formed through the layering shaping method. More specifically, for example, consideration is made to carry out the movement of each component in the layering direction with the shaping unit as a unit. According to such configuration, for example, the necessary non-shaping area can be narrowed as compared to when simultaneously moving all the components in the layering direction. Furthermore, for example, consideration is made to carry out the movement in the layering direction for every module set in the shaping unit. In this case, for example, each module in the shaping unit may be sequentially moved in accordance with the position of the non-shaping area moved according to the rotation of the rotating table 30. According to such configuration, for example, the necessary non-shaping area can be further narrowed. Furthermore, for example, consideration is made to individually carry out the movement in the layering direction for each component of the shaping unit. In this case, the plurality of inkjet heads 12 in one shaping unit may be individually moved. In a variant of the configuration of the shaping device 10, consideration is made to, for example, set a plurality of non-shaping areas, and the like according to, for example, number of shaping units, configuration of the shaping unit, and the like.

In the present example, the 3D object 50 is shaped through the layering shaping method by rotating the rotating table 30 a plurality of times according to the number of layers of the material to be layered in the 3D object 50, as described above. Thus, for example, the operation rate of the inkjet head 12, and the like can be enhanced, and the shaping can be more efficiently carried out as compared to when carrying out shaping through a conventional method. This aspect will be more specifically described below.

Figure 3:
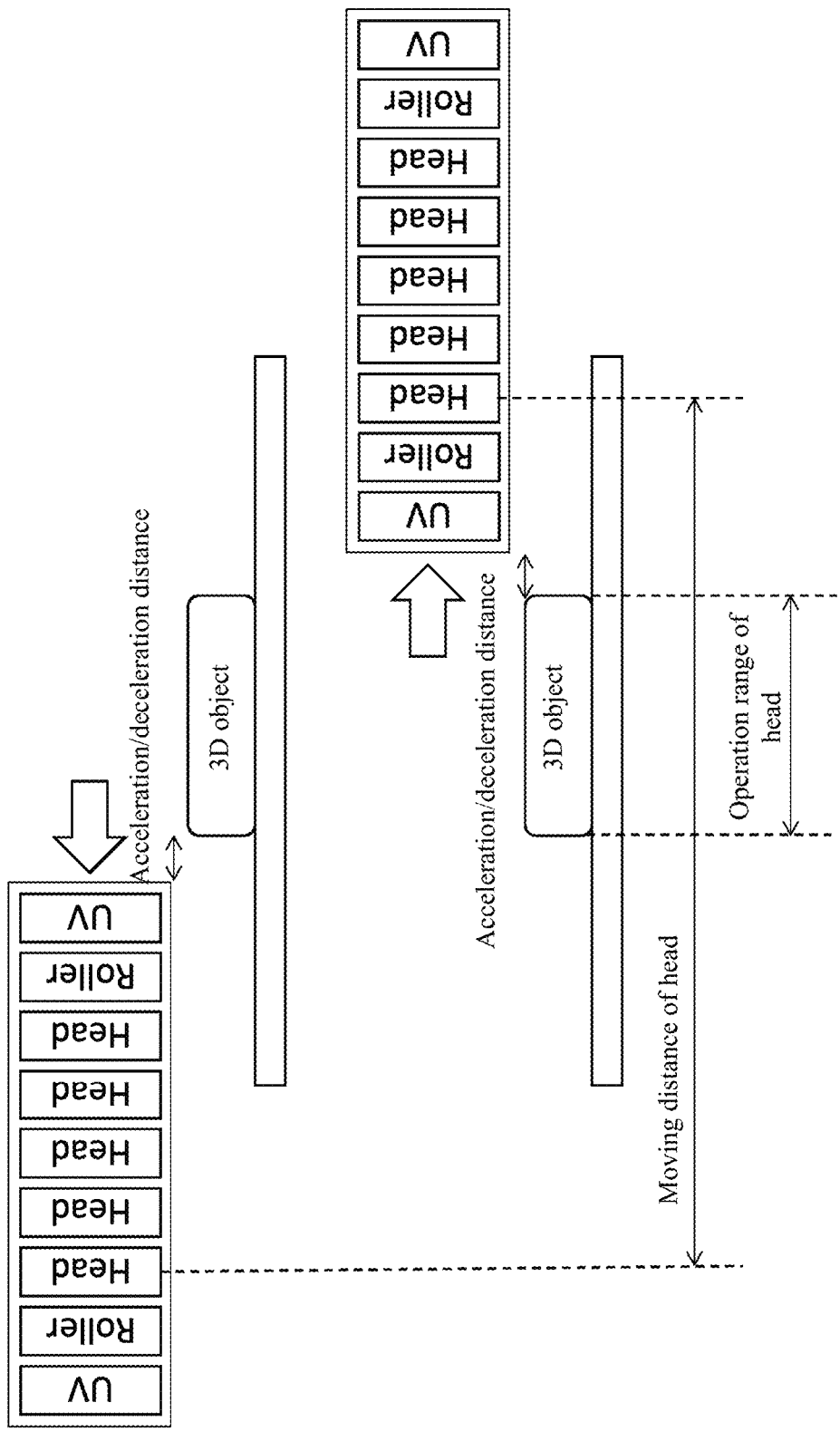
FIG. 3 is a view describing a configuration of a shaping device that carries out shaping through a conventional method.

FIG. 3 is a view describing a configuration of a shaping device that carries out shaping through the conventional method. Conventionally, as a method of carrying out shaping through the layering shaping method using the inkjet head, a method (scan method), in which the operation of a print device that prints a two-dimensional image is put into practice, is known. More specifically, in this case, a layer of the material for shaping is formed by causing the inkjet head to carry out a main scanning operation (scan operation). In this case, for example, the planarizing of the layer and the irradiation of the ultraviolet ray for curing are carried out at the time of the main scanning operation by moving the ultraviolet light source, the roller, and the like with the inkjet head. A plurality of layers are overlapped and formed by carrying out the main scanning operation a number of times corresponding to the number of layers to layer.

When carrying out shaping using the inkjet head, a plurality of inkjet heads are generally used to use various materials. The ultraviolet light source, the roller, and the like are sometimes moved with the inkjet head, as described above. Thus, in the shaping device having such configuration, for example, a head section including a great number of components is moved at the time of the main scanning operation, as shown in the figure. As a result, a length of the head section and a moving distance of the head section become long with respect to a width of the 3D object to be shaped in a moving direction in the main scanning operation.

In the case where the inkjet head is caused to carry out the main scanning operation, it is necessary to make the moving speed thereof at least at the time of discharging the material liquid droplet (ink droplet) constant. Thus, in this case, a section for carrying out acceleration and deceleration is necessary, as indicated as an accelerating/decelerating distance in the figure, for example, before and after starting the discharge of the material liquid droplet. Furthermore, in this case, a proportion of the moving distance of the head becomes large with respect to an operation range of the head, which is a range where the material liquid droplet is discharged from the inkjet head with respect to the 3D object, as shown in the figure. As a result, a proportion of the time for actually operating the inkjet head becomes small in the time required for shaping. In other words, in this case, the time when the inkjet head is not operating becomes long, and a usage efficiency of the inkjet head lowers.

When carrying out shaping through the layering shaping method, a great number of layers needs to be overlapped and formed. In this case, the main scanning operation needs to be repeatedly carried out a great number of times. Thus, when the usage efficiency of the inkjet head lowers in the main scanning operation, the efficiency of the shaping greatly lowers.

On the contrary, in the case of the shaping device 10 of the present example described using FIGS. 1A to 2B, and the like, the lowering of the usage efficiency of the inkjet head 12 described above does not occur as the inkjet head 12 does not need to be caused to carry out the main scanning operation. According to the present example, therefore, the proportion of the time of not discharging the material liquid droplet can be appropriately shortened, for example, for the operation of the inkjet head 12. Furthermore, the usage efficiency of the inkjet head 12 can be thus enhanced and the 3D object 50 can be efficiently and appropriately shaped.

In the case of a configuration for causing the inkjet head to carry out the main scanning operation, the size of the shaping device needs to be made greater than at least the range where the head section moves in the main scanning operation, as apparent from FIG. 3 and the like. As a result, the size of the shaping device tends to become large.

In the shaping device 10 of the present example, on the other hand, each component of the shaping unit can be disposed more compactly. The shaping device 10, for example, thus can be appropriately miniaturized. Thus, according to the present example, for example, a small shaping device 10 can be appropriately supplied, and the like.

Figure 4A:
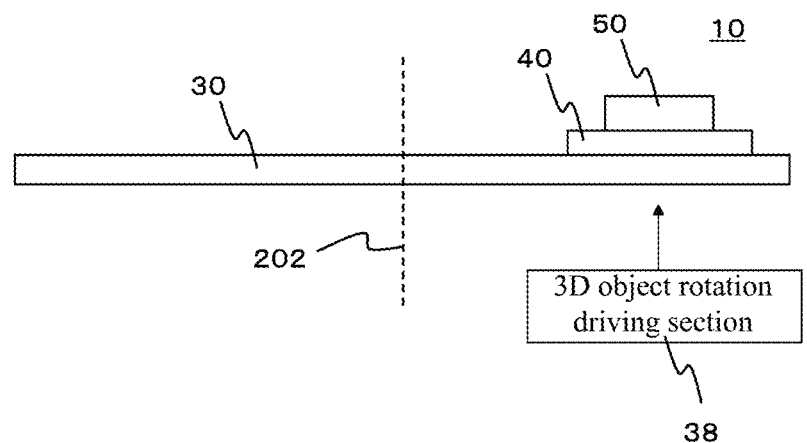
FIGS. 4A and 4B are views showing another example of the configuration of the shaping device 10.
Figure 4B:
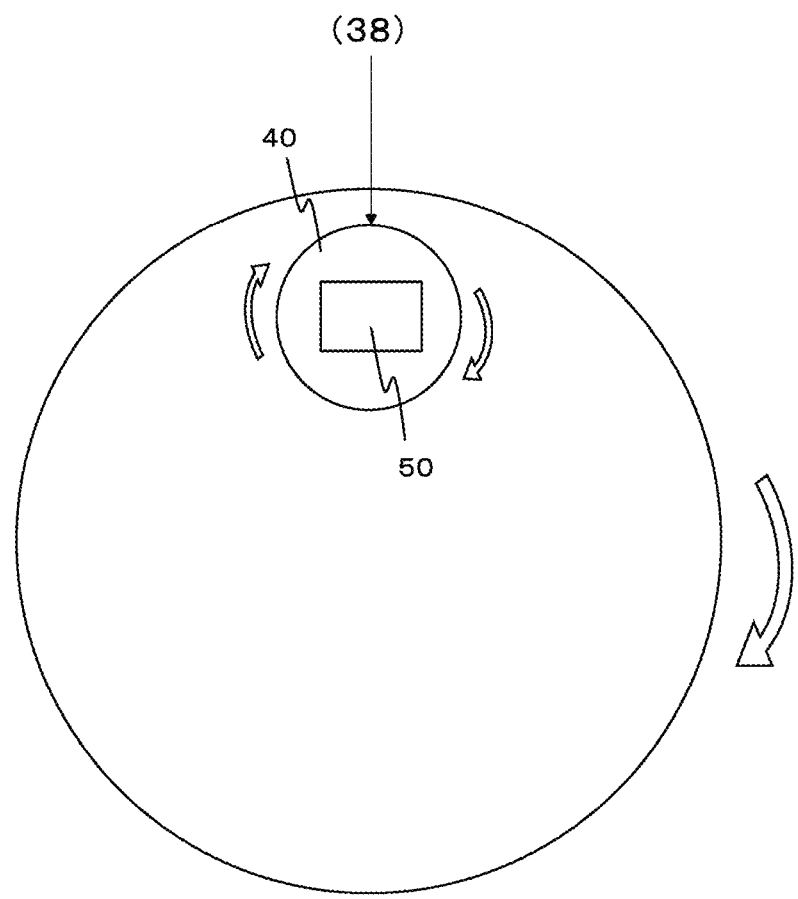

Now, another example (variant) of the configuration of the shaping device 10 will be described. FIGS. 4A and 4B show another example of the configuration of the shaping device 10. FIG. 4A shows one example of a configuration of a main section of the shaping device 10. FIG. 4B is a view describing the operation of the shaping device 10. Other than the aspects described below, the components denoted with the same reference numerals as FIGS. 1A to 3 in FIGS. 4A and 4B may have characteristics same as or similar to the components in FIGS. 1A to 3. Furthermore, other than the illustrated components, the shaping device 10 shown in FIGS. 4A and 4B may further have a component same as or similar to each section of the shaping device 10 shown in FIGS. 1A and 1B.

In the above description, a configuration of moving the 3D object 50 by simply rotating the rotating table 30 has been described using FIGS. 1A to 2B. According to such configuration, for example, the configuration of the shaping device 10 can be more appropriately miniaturized.

However, in this case, a difference is generated between the moving distance on the inner circumferential side and the moving distance on the outer circumferential side of the circumference in the 3D object 50 that moves along the circling path according to the rotation of the rotating table 30. As a result, the accuracy of shaping may be influenced. In particular, for example, when the size of the 3D object 50 to be shaped is large, when the demanded accuracy of shaping is high, and the like, lowering in the accuracy of shaping caused by such difference may become a problem.

On the other hand, the shaping device 10 shown in FIGS. 4A and 4B further includes a 3D object holding section 40 and a 3D object rotation driving section 38, in addition to the configuration shown in FIGS. 1A and 1B. The 3D object holding section 40 is a member for holding the 3D object 50 on the rotating table 30. In such a configuration, the 3D object holding section 40 is, for example, arranged at a position to mount the 3D object 50 in the rotating table 30, and is moved along the circling path accompanying the rotation of the rotating table 30 while holding the 3D object 50. Furthermore, the 3D object holding section 40 is rotatable with the 3D object rotating shaft, which is a shaft parallel to the layering direction, as a center, and rotates according to the drive by the 3D object rotation driving section 38. In this case, when referring to the 3D object holding section 40 rotating, for example, this may mean rotating one part of the 3D object holding section 40 such that the 3D object 50 held by the 3D object holding section 40 rotates.

The 3D object rotation driving section 38 is a driving section that rotates the 3D object holding section 40 with the 3D object rotating shaft as the center. The 3D object rotation driving section 38 rotates the 3D object holding section 40 to also rotate the 3D object 50 held on the 3D object holding section 40 with the 3D object rotating shaft as the center. In this case, the 3D object rotation driving section 38 changes the direction of the 3D object 50 circling on the circling path by rotating the 3D object 50 being shaped by an angle set in advance in the middle of the operation of shaping. The middle of the operation of shaping is, for example, any timing between the start to finish of shaping.

In this case, for example, as shown in FIG. 4B, the 3D object 50 being shaped is rotated accompanying the rotation of the 3D object holding section 40 while moving along the circling path according to the rotation of the rotating table 30. According to such configuration, for example, a region facing the inner circumferential side and the outer circumferential side of the circling path in the 3D object 50 can be changed during the operation of shaping. Furthermore, for example, the influence caused by the difference in the moving distance on the inner circumferential side and the moving distance on the outer circumferential side in the 3D object 50 moving on the circling path thus can be appropriately suppressed.

In this case, the 3D object rotation driving section 38 rotates the 3D object 50 being shaped by 180 degrees at a timing set in advance, for example, to interchange the region facing the inner circumferential side and the region facing the outer circumferential side of the circling path in the 3D object 50. More specifically, the 3D object rotation driving section 38 may rotate the 3D object 50 by 180 degrees, for example, every time the 3D object 50 circles on the circling path a number of times set in advance. In this case, for example, consideration is made to rotate the 3D object 50 by 180 degrees every time the 3D object 50 makes one round on the circling path. According to such configuration, for example, the influence caused by the difference in the moving distance on the inner circumferential side and the moving distance on the outer circumferential side can be appropriately suppressed.

In this case, the control section 36 (see FIGS. 1A and 1B) controls the operation of the inkjet head 12 (see FIGS. 1A and 1B), and the like in the shaping unit in accordance with, for example, the operation of rotating the 3D object 50 by the 3D object rotation driving section 38. The rotation of the 3D object 50 is, for example, preferably carried out at a timing when each component of the shaping unit and the 3D object 50 are not facing each other.

In FIGS. 4A and 4B, only one set of 3D object holding sections 40 and the 3D object 50 are illustrated on the rotating table 30 for the sake of convenience of illustration. However, in the shaping device 10 having such configuration as well, a plurality of 3D objects 50 may be mounted on the rotating table 30, similar to the case illustrated in FIGS. 1A and 1B. In this case, the shaping device 10 includes a plurality of 3D object holding sections 40 on the rotating table 30. The plurality of 3D object holding sections 40 are, for example, arranged so as to be lined in the circumferential direction with the position in the radial direction of the rotating table 30 aligned.

Furthermore, when attempting to carry out shaping at a higher accuracy, parallel movement may be further carried out other than rotation on the 3D object 50 moving on the circling path. In this case, for example, consideration is made to adjust a relative position of the 3D object 50 with respect to the inkjet head 12 by parallel movement.

Figure 5A:
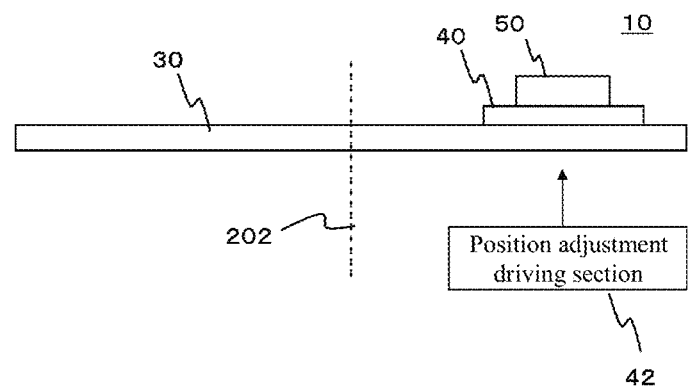
FIGS. 5A to 5C show another further example of the configuration of the shaping device 10.
Figure 5B:
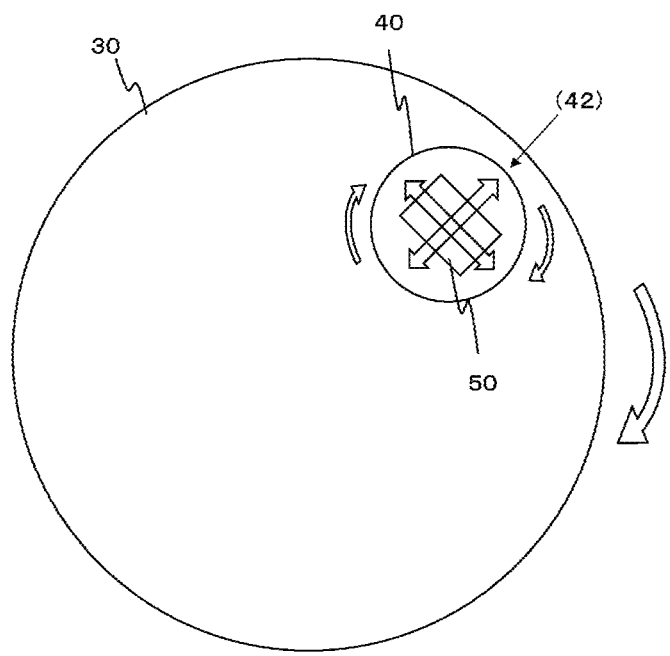
Figure 5C:
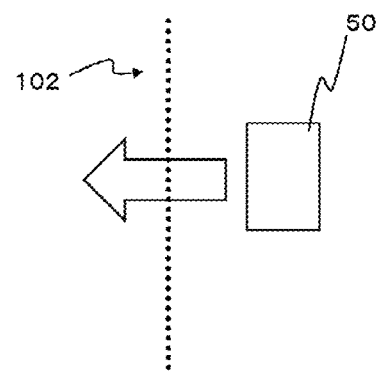

FIGS. 5A to 5C show another further example of the configuration of the shaping device 10. FIG. 5A shows one example of a configuration of a main section of the shaping device 10. FIG. 5B is a view describing an operation of the shaping device 10. FIG. 5C is a view describing a relative position relationship of the nozzle row 102 of the inkjet head 12 (see FIGS. 1A and 1B) and the 3D object 50 being shaped. Other than the aspects described below, the component denoted with the same reference numerals as FIGS. 1A to 4B in FIGS. 5A to 5C may have characteristics same as or similar to the component in FIGS. 1A to 4B. The shaping device 10 shown in FIGS. 5A to 5C may further have a component same as or similar to each section of the shaping device 10 shown in FIGS. 1A and 1B other than the illustrated components.

The shaping device 10 shown in FIGS. 5A to 5C further includes the 3D object holding section 40 and a position adjustment driving section 42, in addition to the configuration shown in FIGS. 1A and 1B. In such configuration, the 3D object holding section 40 is configured to be relatively parallel movable with respect to the rotating table 30, in addition to the characteristics described in relation to FIGS. 4A and 4B. More specifically, in the illustrated configuration, the 3D object holding section 40 is configured to be able to parallel move in the radial direction and the circumferential direction of the rotating table 30 within a range of an adjustment distance set in advance, in addition to being rotatable with the 3D object rotating shaft as the center. In this case, the parallel movement in the radial direction is, for example, the relative movement toward the inner circumferential side and the outer circumferential side in the radial direction of the rotating table 30 with respect to the rotating table 30. The parallel movement in the circumferential direction is the relative movement toward the front side and the back side in a direction orthogonal to the radial direction with respect to the rotating table 30. The front side and the back side are, for example, a side same as the rotating direction of the rotating table 30 and the opposite side thereof. When referring to the 3D object holding section 40 being parallel movable, this may mean that one part of the 3D object holding section 40 parallel moves such that the 3D object 50 held by the 3D object holding section 40 parallel moves.

The position adjustment driving section 42 is a driving section for causing the 3D object holding section 40 to carry out rotation and parallel movement, and changes the relative position with respect to the rotating table 30 for the 3D object 50 by causing the 3D object holding section 40 to carry out rotation and parallel movement. The position adjustment driving section 42 thereby adjusts the relative position of the 3D object 50 with respect to the inkjet head 12 (see FIGS. 1A and 1B). The relative position of the 3D object 50 with respect to the inkjet head 12 is, for example, the relative position of the 3D object 50 with respect to the nozzle row 102 in the inkjet head 12.

More specifically, in this case, at a timing when the 3D object 50 passes the position facing the respective inkjet heads 12 in the shaping device 10, the position adjustment driving section 42 adjusts the relative position of the 3D object 50 such that the direction of relatively moving with respect to the inkjet head 12 becomes a direction orthogonal to the nozzle row direction, as shown in FIG. 5C, for example. According to such configuration, for example, the influence caused by moving the 3D object 50 along the circling path can be more appropriately reduced for the position relationship of the nozzle row 102 and the 3D object 50. Furthermore, for example, the shaping thus can be more appropriately carried out with a higher accuracy.

In this case, the position adjustment driving section 42, for example, adjusts the relative position of the 3D object 50 every time the 3D object 50 passes the position facing the respective inkjet heads 12 in the shaping device 10. The control section 36 (see FIGS. 1A and 1B) controls the operation of the inkjet head 12 and the like in accordance with the operation of adjusting the position of the 3D object 50 by the position adjustment driving section 42.

In FIGS. 5A to 5C, only one set of 3D object holding sections 40 and the 3D object 50 are illustrated on the rotating table 30 for the sake of convenience of illustration. However, in the shaping device 10 having such configuration as well, a plurality of 3D objects 50 may be mounted on the rotating table 30, similar to the configuration described above in relation to FIGS. 4A and 4B.

Further modifications may be considered for the configuration of the shaping device 10. For example, in the description made above, a configuration of fixing the inkjet head 12 at a predetermined position of the circling path has been mainly described for the position within a plane orthogonal to the layering direction. However, in the variant of the configuration of the shaping device 10, for example, consideration is made to move the position of the inkjet head 12, and the like. More specifically, for example, consideration is also made to change the position of the inkjet head 12 in the nozzle row direction for every layer to be layered assuming the inkjet head 12 is movable in the nozzle row direction. In this case, for example, consideration is made to enhance the resolution of shaping, and the like by shifting the position of the inkjet head 12 by a distance smaller than a nozzle pitch. Furthermore, for example, consideration is made to change the nozzle for discharging the material liquid droplet to each position of the region to be discharged of the 3D object 50, and the like by shifting the position of the inkjet head 12 for every layer. In this case, for example, consideration is made to make the nozzle on at least one end side in the nozzle row unusable and adjust the entire position of the nozzle row.

Furthermore, in the description made above, a configuration of moving the 3D object 50 using the rotating table 30 has been mainly described with respect to the circling path for moving the 3D object 50. However, the method of moving the 3D object 50 is not limited to the case where the rotating table 30 is used, and other methods may be used.

Figure 6A:
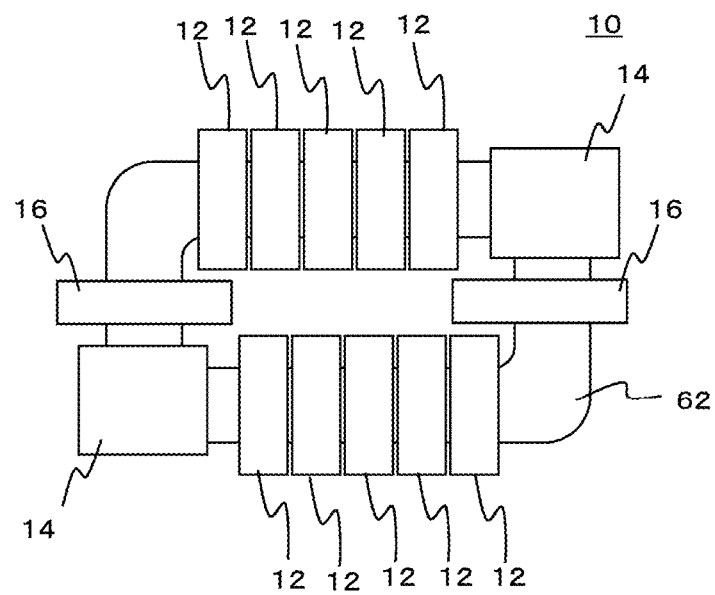
FIGS. 6A to 6C are views showing another further example of the configuration of the shaping device 10.
Figure 6B:
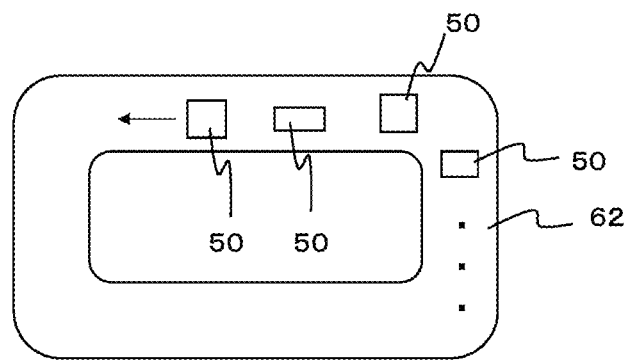
Figure 6C:
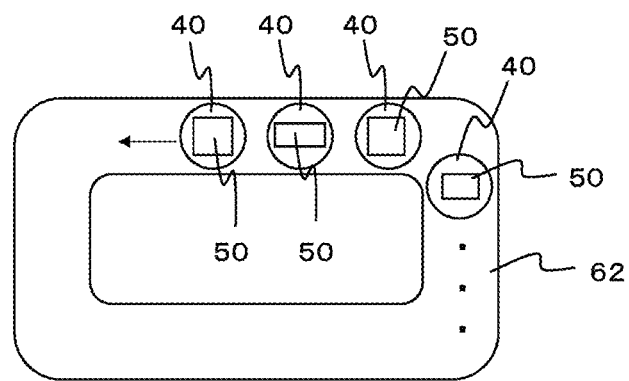

FIGS. 6A to 6C show another example of a configuration of the shaping device 10. FIG. 6A shows one example of a configuration of a main section of the shaping device 10. In FIG. 6A, a configuration of the shaping device 10 is illustrated with the 3D object 50 omitted for the sake of convenience of illustration. FIG. 6B shows one example of a state of moving the 3D object 50 along the circling path.

Other than the aspects described below, the component denoted with the same reference numerals as FIGS. 1A to 5C in FIGS. 6A to 6C may have characteristics same as or similar to the component in FIGS. 1A to 5C. The shaping device 10 shown in FIGS. 6A to 6C may further have a component same as or similar to each section of the shaping device 10 shown in FIGS. 1A and 1B, as necessary, other than the illustrated components. For example, the shaping device 10 shown in FIGS. 6A to 6C may, other than the illustrated components, further include the circling driving section 32, the layering direction driving section 34, the control section 36, and the like. In this case, such components have characteristics appropriately changed according to the difference in the way of moving the 3D object 50, and the like.

In the configuration illustrated in FIGS. 6A to 6C, the shaping device 10 moves the 3D object 50 using a transportation device 62 rather than through a method using the rotating table. The transportation device 62, for example, is a conveyor device that transports the 3D object 50 by moving a mounting surface, which is a surface on which the 3D object 50 is mounted, and transports the 3D object 50 according to a driving force of the circling driving section 32 (see FIGS. 1A and 1B). The transportation device 62 is a circling type transportation device that moves the mounting surface along the circling path set in advance, and moves the 3D object 50 along the circling path. In this case, for example, a plurality of 3D objects 50 may be simultaneously transported, as shown in FIG. 6B.

In this case as well, the inkjet head 12, the ultraviolet light source 14, and the roller 16, which are components of the shaping unit, are arranged along the circling path. Thus, each component of the shaping unit carries out the operation of shaping with respect to the 3D object 50 moving along the circling path.

More specifically, in the illustrated configuration, the transportation device 62 moves the 3D object 50 along the circling path including a linear portion and a nonlinear portion. In this case, the inkjet head 12 and the roller 16 are arranged at positions facing the linear portion in the circling path. The inkjet head 12 thereby discharges the material liquid droplet (ink droplet) to the region to be discharged of the 3D object 50 while the 3D object 50 moves along the linear portion in the circling path. The roller 16 carries out the operation of planarizing while the 3D object 50 moves along the linear portion in the circling path.

In this case, the inkjet head 12 is, for example, arranged in a direction in which the moving direction of the 3D object 50 at the linear portion and the nozzle row direction become orthogonal. The roller 16 is, for example, arranged in a direction in which the moving direction of the 3D object 50 in the linear portion and the rotating shaft become orthogonal.

According to such configuration, for example, the operations of discharging and planarizing of the material liquid droplet can be carried out with the nozzle row direction and the rotating shaft of the roller 16 aligned to a constant direction with respect to the moving 3D object 50. Thus, the accuracy of the shaping can be appropriately enhanced as compared to, for example, when carrying out the discharging and planarizing of the material liquid droplet with respect to the 3D object 50 moving on a path of a curved line.

In this case, the influence caused by the relationship with the direction of the 3D object 50 is assumed to be small for the ultraviolet light source 14 as compared to, for example, the inkjet head 12 and the roller 16. Thus, the ultraviolet light source 14 may be arranged at a position facing the nonlinear portion in the circling path, as in the illustrated configuration. In this case, the ultraviolet light source 14 irradiates the 3D object 50 with the ultraviolet ray while the 3D object 50 moves along the nonlinear portion in the circling path. According to such configuration, for example, each component of the shaping unit can be more efficiently disposed along the circling path.

The roller 16, for example, may also be arranged at a position facing the nonlinear portion in the circling path depending on the demanded accuracy of shaping. Furthermore, consideration is also made to arrange the inkjet head 12 at a position facing the nonlinear portion in the circling path. In this case, for example, consideration is also made to use the transportation device 62 that does not include the linear portion. Furthermore, when there is a sufficient space in the transportation device 62, and the like, the ultraviolet light source 14 is preferably arranged at a position facing the linear portion in the circling path. According to such configuration, for example, the 3D object 50 can be more evenly irradiated with the ultraviolet ray.

When using the transportation device 62 as well, consideration is made to use the 3D object holding section 40 rather than directly mounting the 3D object 50 on the transportation device 62. FIG. 6C shows one example of a configuration in the case the 3D object 50 is held using a 3D object holding section 40. In this case, the 3D object holding section 40 is mounted on the mounting surface of the transportation device 62 while holding the 3D object 50. According to such configuration as well, the 3D object 50 can be appropriately moved along the circling path.

In this case, for example, the 3D object 50 being shaped may be rotated at a timing set in advance with the same or similar configuration as described using FIGS. 4A and 4B. For example, when arranging at least some of the components (e.g., ultraviolet light source 14 etc.) of the shaping unit at a position facing the nonlinear portion in the circling path, and the like, the 3D object holding section 40 is preferably appropriately rotated. According to such configuration, for example, the 3D object 50 can be shaped at a higher accuracy. For example, as necessary, the 3D object holding section 40 may be further parallel-moved with the same or similar configuration as described using FIGS. 5A to 5C.

When considered in a more generalized manner, the circling path used in the shaping device 10 described using FIGS. 1A to 6C can be considered as a path set within a plane facing the inkjet head 12. In this case, setting the circling path within a plane facing the inkjet head 12 may be, for example, setting the circling path substantially within the relevant plane. Furthermore, setting the circling path substantially within the relevant plane may be, for example, setting the circling path within the plane at an accuracy allowing microscopic step difference, and the like caused by the mechanical structure, the convenience of the operation, and the like.

In this case, the operation of the circling driving section 32 can be considered as an operation of circling the 3D object 50 being shaped along the circling path with the layering direction perpendicular to the relevant plane. According to such configuration, for example, the region to be discharged of the 3D object 50 can be appropriately circled along the circling path. In this case, the configuration of a specific circling path is not limited to the configuration illustrated in FIGS. 1A to 6C, and can be variously modified.

In a further variant of the configuration of the shaping device 10, consideration is made to use a circling path other than the path set within the plane facing the inkjet head 12. In this case, a method of rotating the 3D object 50 being shaped with a predetermined shaft as a center, and the like, for example, is considered as a method of circling the region to be discharged of the 3D object 50 along the circling path.

Figure 7A:
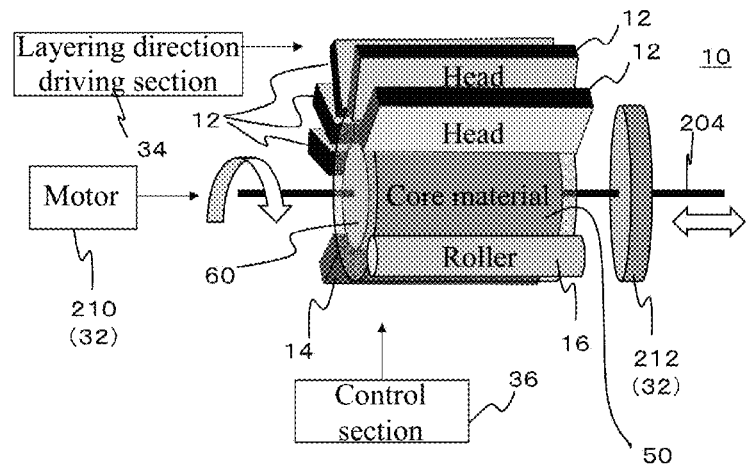
FIGS. 7A to 7C are views showing another further example of the configuration of the shaping device 10.
Figure 7B:
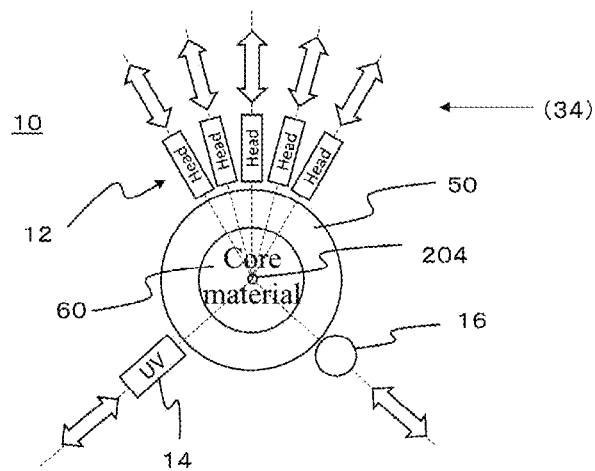
Figure 7C:
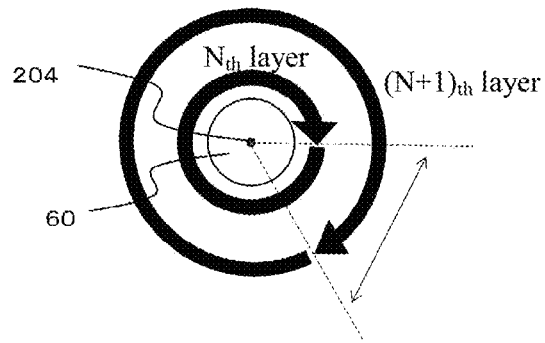

FIGS. 7A to 7C show another further example of a configuration of the shaping device 10. FIG. 7A is a perspective view showing one example of a configuration of a main section of the shaping device 10. FIGS. 7B and 7C are views describing a driving method of driving each section of the shaping device 10. Other than the aspects described below, the component denoted with the same reference numerals as FIGS. 1A to 6C in FIGS. 7A to 7C may have characteristics same as or similar to the component in FIGS. 1A to 6C.

In the configuration illustrated in FIGS. 7A to 7C, the shaping device 10 circles the region to be discharged in the 3D object 50 along the circling path by rotating the 3D object 50 with the rotating shaft 204 as the center. The rotating shaft 204 serves as an example of a layering center shaft, which is a shaft perpendicular to the layering direction. In this configuration, the 3D object 50 is formed by layering a layer of the material for shaping at the periphery of a core material 60 constituting the interior. The core material 60 is a columnar shaped member, and is mounted to be rotatable with the rotating shaft 204 as a center, with the axial direction parallel to the rotating shaft 204, at the time of shaping.

If the core material 60 has a columnar shape, this means that, for example, the shape on the outer side of the main section has a columnar shape. Thus, for example, the cylindrical core material 60 having a hollow interior, and the like can also be considered as one example of the columnar shaped core material 60.

In the shaping device 10, the circling driving section 32 configured from the motor 210, the encoder 212, and the like rotates the core material 60 with the rotating shaft 204 as the center. The respective inkjet heads 12 in the shaping unit discharges the material liquid droplet onto the rotating core material 60.

More specifically, in this case, the 3D object 50 being shaped is held about the rotating shaft 204 in a direction in which the layer of the material formed first becomes the inner side and the layer of the material formed next becomes the outer side with respect to the rotating shaft 204. The circling driving section 32 rotates the 3D object 50 with the rotating shaft 204 as the center with the region to be discharged of the 3D object 50 facing the outer side. Thus, the circling driving section 32 circles the region to be discharged of the 3D object 50 along the circling path circling around the rotating shaft 204.

In this case, for example, the layering direction driving section 34 changes the position of each component of the shaping unit in accordance with the thickness of the layer formed around the core material 60. Thus, the plurality of inkjet heads 12 are arranged at positions spaced apart from the rotating shaft 204 than the region to be discharged of the 3D object 50, and discharge the material liquid droplet in a direction directed toward the rotating shaft 204. The plurality of inkjet heads 12 thus form each layer of the material for shaping by, for example, an operation of one path of carrying out one discharge of the material liquid droplet per one round of the 3D object 50 with respect to each position of the position to be discharged. The roller 16 carries out planarizing at a position corresponding to the thickness of the layer formed around the core material 60. The ultraviolet light source 14 emits the ultraviolet ray from the position spaced further apart from the rotating shaft 204 than the region to be discharged of the 3D object 50.

According to such configuration as well, for example, the 3D object 50 can be appropriately shaped through the layering shaping method by circling the region to be discharged of the 3D object 50 along the circling path, discharging the material liquid droplet from the inkjet head 12 to the circling region to be discharged, and the like. In this case as well, the inkjet head 12 does not need to be caused to carry out the main scanning operation, and hence the proportion of the time in which the material liquid droplet is not discharged from the inkjet head 12 can be appropriately shortened. Furthermore, the usage efficiency of the inkjet head 12 can be enhanced and the 3D object 50 can be efficiently and appropriately shaped. In this case as well, each configuration of the shaping unit can be more compactly disposed since the width, and the like of the main scanning operation does not need to be taken into consideration. The shaping device 10, for example, thus can be appropriately miniaturized.

Furthermore, in this case, the shaping of the interior of the 3D object 50 can be omitted by shaping the 3D object 50 using the core material 60. The time required for shaping thus can be shortened, the material for shaping can be saved, and the like.

In this configuration as well, the motor 210 in the circling driving section 32 continues to rotate at a constant speed without stopping during the operation of the shaping, similar to the case described using FIGS. 1A and 1B, and the like. The layering direction driving section 34, for example, moves each component of the shaping unit at a timing corresponding to the edge of the encoder 212. In this case as well, the layering direction driving section 34, for example, preferably moves each component with the linear motor, and the like.

In the shaping device 10 shown in FIGS. 7A to 7C, the core material 60 is further configured to be movable in a direction parallel to the rotating shaft 204. In this case, for example, consideration is made to move the core material 60 by moving the rotating shaft 202 in the axial direction. In this case, for example, consideration is made to change the relative position of the inkjet head 12 with respect to the core material 60 for every layer by moving the core material 60 every time each layer of the 3D object 50 is formed. In this case, for example, consideration is made to enhance the resolution of the shaping, and the like by shifting the position of the core material 60 by a distance smaller than the nozzle pitch in the nozzle row of the inkjet head 12. Furthermore, consideration is made, for example, to change the nozzle for discharging the material liquid droplet to each position of the region to be discharged of the 3D object 50, and the like by shifting the position of the core material 60 for every layer. In this case, for example, consideration is made to make the nozzle on at least on one end side in the nozzle row of the inkjet head 12 unusable and adjust the entire position of the nozzle row.

The movement of the core material 60 may be a relative movement with respect to the inkjet head 12. Thus, such relative movement may be carried out by moving the inkjet head 12 side. Furthermore, such movement of the core material 60 and the inkjet head 12 is, for example, preferably carried out with the linear motor, and the like.

Further, the specific configuration of the shaping unit and the like of the shaping device 10 is not limited to the illustrated configuration, and may be changed variously. For example, a plurality of the ultraviolet light sources 14 may be arranged in one set of shaping units. In this case, for example, consideration is made to arrange the ultraviolet light source 14 between the inkjet heads 12, and the like. In FIGS. 7A to 7C, only the inkjet heads 12, the ultraviolet light source 14, and the roller 16 for one set of shaping units are illustrated. However, in the variant of the configuration of the shaping device 10, a plurality of sets of shaping units may be mounted.

As described above, in the shaping device 10 having such configuration, the shaping of the 3D object 50 is carried out without stopping the rotation of the core material 60. On the other hand, each component of the shaping unit needs to be moved according to the thickness of the layer formed on the core material 60.

In this case, more specifically, for example, consideration is made to move, in order, from a module (inkjet head 12, roller 16, ultraviolet light source 14 etc.), in which the formation of the $N_{th}$ layer ($N_{th}$ layer) is completed, of the components of the shaping unit, as shown in FIG. 7C. In this case, the timing of movement of each module may be different. Furthermore, in this case, for example, consideration is made to set a predetermined region such as a section indicated with two broken lines and a double-headed arrow in the figure, and move the module at a timing when the region to be discharged of the 3D object 50 passes the relevant region. According to such configuration, for example, the 3D object 50 can be appropriately shaped on the core material 60.

Furthermore, in this case, the timing of moving each module may be differed for every layer. According to such configuration, for example, the position of seam formed between the layers may be differed for every layer. The seam thus can be prevented from standing out.

The portion of such seam may be overlapped with the layer after the $N_{th}$ layer ($(N+1)_{th}$ layer) by, for example, applying a mask and controlling the discharge of the material liquid droplet from each inkjet head 12. According to such configuration, for example, the seam can be more appropriately prevented from standing out.

Figure 8A:
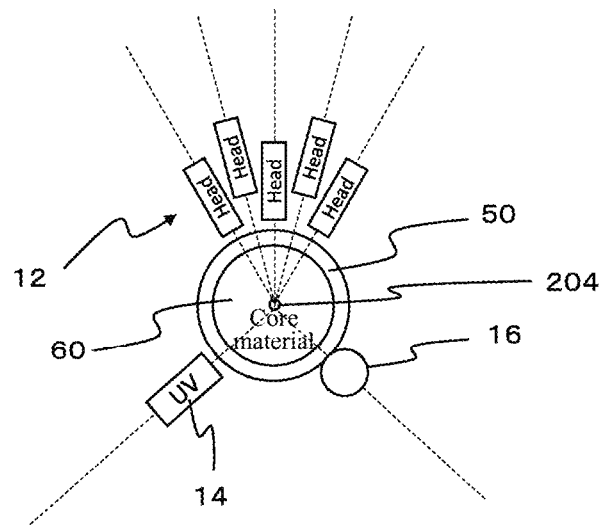
FIGS. 8A and 8B are views showing one example of an operation of shaping carried out using the shaping device 10.
Figure 8B:
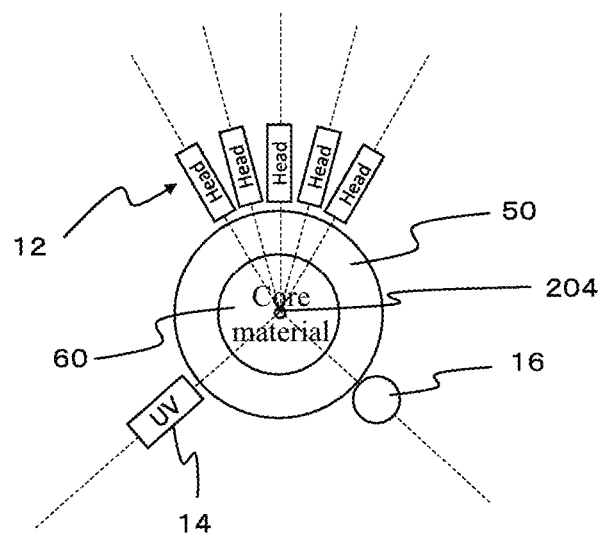

Next, an example of an operation of shaping carried out using such shaping device 10 will be further described in detail. FIGS. 8A and 8B are views showing one example of an operation of shaping carried out using the shaping device 10, and shows an example of an operation in the case where the number of inkjet heads 12 to be used is changed according to the diameter of the 3D object 50. FIG. 8A shows one example of an operation of shaping carried out when the diameter of the 3D object 50 is small. FIG. 8B shows one example of an operation of shaping carried out when the diameter of the 3D object 50 is large.

As shown in FIG. 8A, when the diameter of the 3D object 50 is small, consideration is made to carry out shaping by selectively using some inkjet heads 12 rather than using all of the plurality of inkjet heads 12 arranged in the shaping device 10. According to such configuration, for example, the inkjet head 12 to be used can be more appropriately disposed with respect to the periphery of the 3D object 50 having a small diameter.

In this case, as a way of selecting some inkjet heads 12, for example, consideration is made to select some inkjet heads 12 according to the necessary color of the inkjet heads 12 for coloring. At the time of shaping of the 3D object 50 in which coloring is not carried out, and at the time of shaping of the interior of the 3D object 50, consideration is made not to not use the inkjet head 12 for coloring and to select only the inkjet head 12, and the like for model material. Furthermore, when the number of the required inkjet heads 12 is large with respect to the diameter of the 3D object 50, and the like, the inkjet heads 12 selected for the required inkjet heads 12 may be sequentially interchanged, and the required inkjet heads 12 may be used in order.

Moreover, as shown in FIG. 8B, when the diameter of the 3D object 50 is large, consideration is made to carry out the shaping using a greater number of inkjet heads 12. In this case, for example, consideration is made to use all of the plurality of inkjet heads 12 arranged in the shaping device 10. According to such configuration, for example, the 3D object 50 having a large diameter can be more efficiently shaped.

The diameter of the 3D object 50 may, for example, be a diameter of the 3D object 50 at the time point when the shaping is completed. According to such configuration, for example, the number of inkjet heads 12 to be used can be appropriately set according to the diameter of the 3D object 50 to be shaped.

The diameter of the 3D object 50 may, for example, be a diameter of the 3D object at a time point of middle of shaping. In this case, for example, the diameter of the 3D object 50 at the beginning of the operation of shaping becomes small. Furthermore, the diameter of the 3D object 50 thereafter gradually becomes larger according to the progress of shaping. Thus, in this case, consideration is made to use a few number of inkjet heads 12 at the beginning of the operation of shaping, and thereafter, increase the number of the inkjet heads 12 to be used. According to such configuration, for example, the number of inkjet heads 12 to be used can be appropriately set according to the diameter of the 3D object 50 being shaped.

More specifically, in this case, consideration is made not to use the inkjet head 12 for coloring and to select the other inkjet head 12 at a time point when coloring is unnecessary at the beginning of the operation of shaping. In this case, for example, the inkjet head 12 for coloring is selected, as necessary, after the progress of shaping.

In this configuration, the diameter of the 3D object 50 is one example of a size of the 3D object 50. Considering the operation of selecting the inkjet head 12 to be used as described above in a more generalized manner, it can be considered to be an operation of carrying out shaping using a first number of inkjet heads 12 when the size of the 3D object 50 is greater than a reference size set in advance, and carrying out shaping using a second number of inkjet heads 12, fewer than the first number, when the size of the 3D object 50 is smaller than or equal to such reference size.

Next, an operation of shaping the 3D object 50 having various shapes using the shaping device 10 will be described. As described above, in the shaping device 10 described using FIGS. 7A to 7C, and the like, the shaping of the 3D object 50 is carried out by discharging the material liquid droplet with the inkjet head 12 to the periphery of the core material 60.

In this case, consideration is also made to use the core material 60 of various shapes for the core material 60 instead of a simple columnar shaped member, and the like. According to such configuration, for example, the 3D object 50 of various shapes can be more efficiently shaped. In this case, consideration is made to also shape the core material 60 with the shaping device in advance. According to such configuration, for example, the core material 60 of various shapes can be used. Furthermore, for example, the shaping of a free shape can be more appropriately carried out.

Figure 9A:
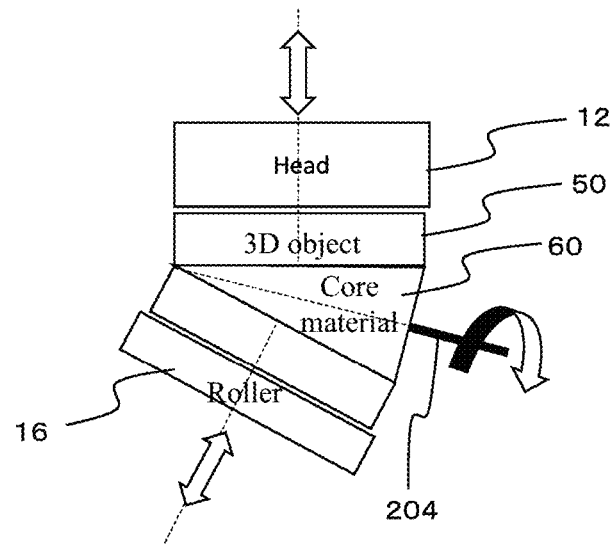
FIGS. 9A and 9B are views showing an example of an operation of carrying out shaping of an end face of the 3D object 50 with the shaping device 10.
Figure 9B:
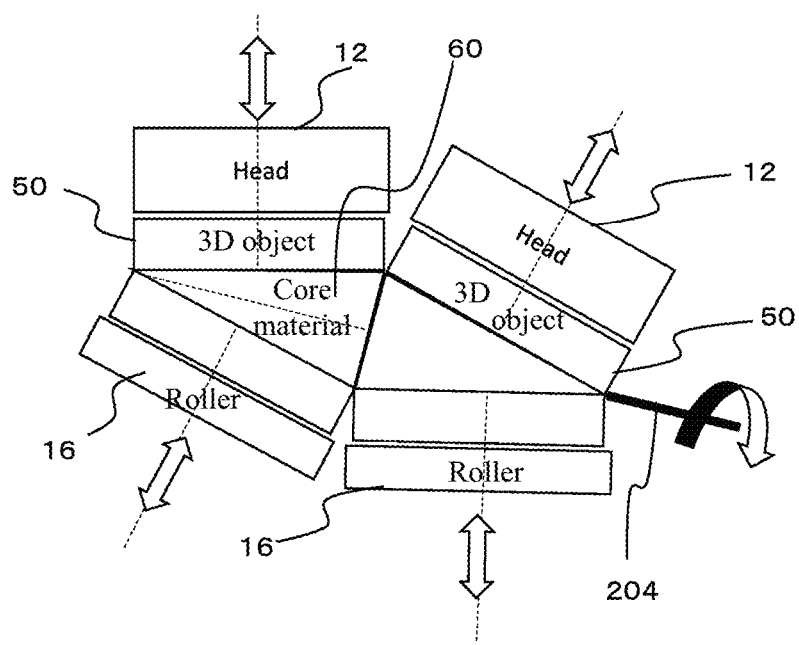
Figure 10A:
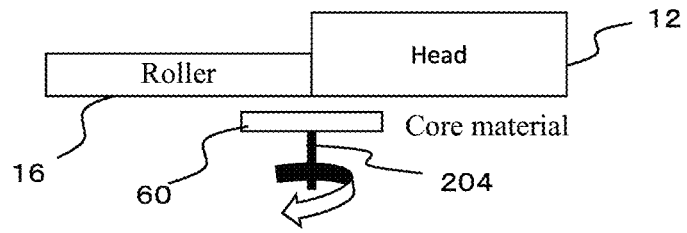
FIGS. 10A to 10D are views showing an example of an operation of carrying out shaping of an end face of the 3D object 50 with the shaping device 10.
Figure 10B:
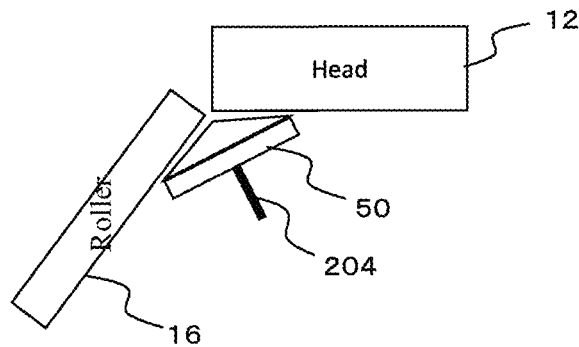
Figure 10C:
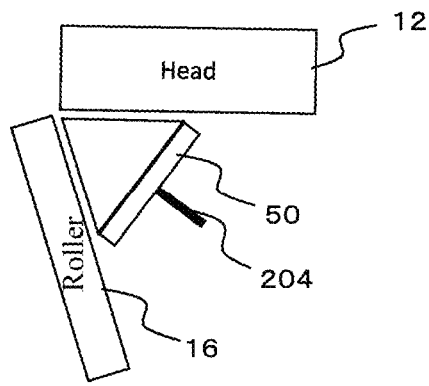
Figure 10D:
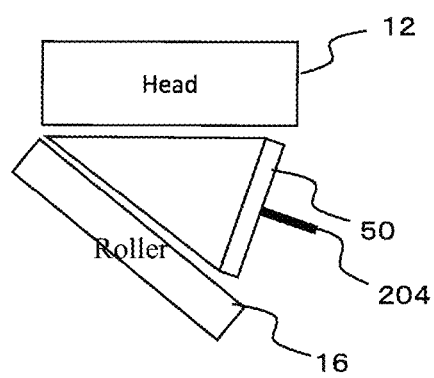

Furthermore, in this case, the shaping of an end face of the 3D object 50, and the like can be carried out by appropriately adjusting the position relationship of the inkjet head 12, the roller 16, and the like with respect to the core material 60. FIGS. 9A to 10D show an example of an operation of carrying out shaping of the end face of the 3D object 50 with the shaping device 10. FIG. 9A shows an example of an operation of carrying out shaping of the end face for the case where a triangular pyramid shaped core material 60 is used. FIG. 9B shows an example of an operation of carrying out shaping of the end face for the case where the core material 60 having a shape in which two bottom surfaces of two triangular pyramid shapes are combined is used. FIGS. 10A to 10D show, in order, an operation sequentially carried out to carry out the shaping of the end face for the case where a circular plate shaped core material 60 is used.

As shown in such figures, the end face, and the like of the 3D object 50 can be appropriately shaped by appropriately adjusting the positions of the inkjet head 12, the roller 16, and the like according to shape of the core material 60 and the shape of the 3D object 50 to be shaped. Furthermore, the 3D object 50 of various shapes thus can be appropriately shaped. More specifically, for example, consideration is made to shape a face of a figure (doll), and the like with the shaping device 10. In this case, the face of the figure may be a portion configuring at least one part of the face in a completed product of the figure. Furthermore, in this case, consideration is made to carry out the specific operation of shaping the face of the figure through various methods.

FIGS. 11A to 11D are views describing a method for shaping the face of the figure. FIGS. 11A to 11D show an example of a method for shaping the face of the figure.

For the sake of convenience of illustration, in FIGS. 11A to 11D, a support layer, and the like necessary at the time of shaping are omitted, and only a shaping section to become a main body of the 3D object 50 is shown. In this case, the support layer is a layer for supporting the shaping section at the time of shaping, and is formed by the inkjet head 12 for support material. The support layer is removed after the completion of shaping. The shaping section of the 3D object 50 is, for example, a portion that remains as a resultant of shaping after the removal of the support layer.

FIG. 11A shows an example of an operation in the case where one 3D object 50 is shaped using the columnar shaped core material 60. In this case, the interior of the 3D object 50 is constituted with the core material 60 as in the illustration. The 3D object 50 to become the face of the figure is shaped by layering the layer of the material for shaping over the entire periphery of the core material 60. According to such configuration, the 3D object 50 to become the face of the figure can be appropriately shaped. In this case, the time required for shaping can be appropriately shortened, for example, by constituting the interior of the 3D object 50 with the core material 60. The material to be used at the time of shaping can also be reduced.

FIG. 11B shows an example of an operation in the case where one 3D object 50 is shaped by layering a layer of the material for shaping over the entire periphery of the core material 60 using the circular cone shaped core material 60. In this case as well, the 3D object 50 to become the face of the figure can be appropriately shaped, similar to the case shown in FIG. 11A. In this case as well, the time required for shaping can be appropriately shortened, for example, by constituting the interior of the 3D object 50 with the core material 60. The material to be used at the time of shaping thus can also be reduced. Furthermore, in this case, for example, the rotating shaft 204 may be tilted with respect to the inkjet head 12. According to such configuration, for example, the 3D object 50 can be more appropriately shaped when using the circular cone shaped core material 60.

FIG. 11C shows an example of an operation in the case where a plurality of 3D objects 50 is shaped at the periphery of the core material 60. In this case, the core material 60 is used as a base of shaping, as illustrated, instead of constituting the interior of the 3D object 50 with the core material 60. In this case, for example, the columnar shaped core material 60 can be suitably used for the core material 60. According to such configuration, for example, a plurality of 3D objects 50 to become the face of the figure can be simultaneously shaped. The 3D object 50 thus can be efficiently shaped. Furthermore, in this case, the 3D object 50 is detached from the core material 60 after the completion of shaping. Thus, for example, the core material 60 can be repeatedly used, and the like.

FIG. 11D shows an example of an operation of simultaneously shaping a great number of 3D objects 50 for the case where the plurality of 3D objects 50 are shaped at the periphery of the core material 60. In this case as well, for example, the core material 60 is used as the base of shaping, similar to the case shown in FIG. 11C. The plurality of 3D objects 50 are simultaneously shaped such that, for example, the plurality of 3D objects 50 are lined along the circumferential direction of a cross-section of the core material 60 at the periphery of the core material 60. According to such configuration, for example, the plurality of 3D objects 50 can be more efficiently shaped.

Now, as described above, the support layer, and the like are omitted, and only the shaping section of the 3D object 50 is shown in FIGS. 11A to 11D. However, at the time of the actual shaping, the support layer sometimes needs to be formed according to the shape of the shaping section in the 3D object 50 to be shaped.

Figure 12:
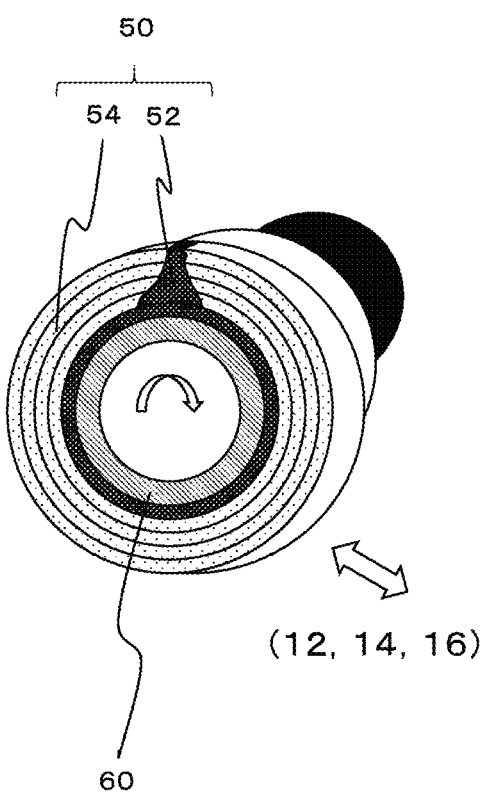
FIG. 12 is a view showing one example of a state at the time of shaping by the shaping device 10.

FIG. 12 is a view showing one example of a state at the time of shaping by the shaping device 10, and more specifically shows, including the support layer, the layer of the material for shaping formed by the plurality of inkjet heads 12 in the shaping unit. As illustrated, at the time of shaping of the 3D object 50, the 3D object 50 is shaped using the shaping unit including the inkjet head 12, the ultraviolet light source 14, and the roller 16. In this case, the core material 60 is rotated and the shaping unit is appropriately moved in a direction of moving away from the core material 60 to layer the material for shaping and to form the shaping section 52 and the support layer 54 in the 3D object 50.

According to such configuration, for example, the 3D object 50 can be appropriately shaped through the layering shaping method.

When shaping the face of the figure, for example, it is sometimes difficult to carry out shaping with the shaping device 10 at fine areas such as the hair. Thus, in such a case, consideration is made to shape the portion other than the area where shaping is difficult such as the hair, and the like with the shaping device 10. In this case, for example, consideration is made to place a separately prepared wig, and the like on the 3D object 50 (shaping section 52) after the shaping.

In the description made above, the portion including the shaping section 52 and the support layer 54 is considered as the 3D object 50 for the sake of convenience of explanation. Furthermore, focusing on the ultimately remaining resultant of shaping, the shaping section 52 excluding the support layer 54 may be considered as the 3D object 50.

INDUSTRIAL APPLICABILITY

The present disclosure can be suitably used in, for example, the shaping device.

What is claimed is:

1. A shaping device that shapes a three-dimensional (3D) object through a layering shaping method, the shaping device comprising:
    a discharging head that discharges a material liquid droplet, which is a liquid droplet of a material for the 3D object;
    a circling driving section that relatively circles at least a region to be discharged, which is a region to which the material liquid droplet is discharged in the 3D object being shaped, along a circling path set in advance with respect to the discharging head;
    a platform that is rotatable along a platform rotating shaft using the platform rotating shaft as a center, wherein the platform rotating shaft is a shaft parallel to a layering direction, which is a direction in which the material is layered in the 3D object being shaped;
    a layering direction driving section that moves the discharging head in the layering direction; and
    a control section that controls the layering direction driving section, wherein
    the circling driving section causes the region to be discharged to circle the circling path plural times;
    the discharging head discharges the material liquid droplet onto the region to be discharged circling on the circling path;
    the circling path is a path set within a plane facing the discharging head;
    the 3D object being shaped is mounted on the platform;
    the discharging head is arranged at a position facing a top surface of the platform;
    the circling driving section rotates the platform with the platform rotating shaft as the center to circle the 3D object being shaped along the circling path, which is a circumferential shaped circling path having the platform rotating shaft as the center, and with the layering direction perpendicular to the plane facing the discharging head, so as to circle the region to be discharged along the circling path, and
    wherein the platform is provided with a non-shaping area and a shaping area, which is an area other than the non-shaping area, the non-shaping area is an area where the shaping of the 3D object is not performed, the shaping area is an area where the shaping of the 3D object is performed, a size of the non-shaping area is corresponding to a size of the 3D object, the discharging head is in a non-operating state at a timing of facing the non-shaping area, and the control section controls the layering direction driving section to move the discharging head in the layering direction in the non-shaping area.

2. The shaping device according to claim 1, wherein a plurality of the discharging heads are arranged; and
    each of the discharging heads discharges the material liquid droplet onto the region to be discharged at positions different from each other in the circling path.

3. The shaping device according to claim 1, wherein the material of the 3D object is an ultraviolet curing type resin that cures by irradiation of an ultraviolet ray;
    the shaping device further comprises an ultraviolet light source that emits the ultraviolet ray; and
    the ultraviolet light source irradiates the region to be discharged with the ultraviolet ray at a timing when the region to be discharged passes an ultraviolet irradiating position set in advance in the circling path.

4. The shaping device according to claim 1, further comprising a planarizing means that planarizes the layer of the material formed in the region to be discharged, wherein
    the planarizing means planarizes the layer of the material at a timing when the region to be discharged passes a planarizing position set in advance in the circling path.

5. The shaping device according to claim 1, wherein the layering direction driving section relatively moves the discharging head with respect to the 3D object being shaped in a direction of moving away from the 3D object being shaped according to a height in which the layer of the material is layered in the 3D object being shaped.

6. The shaping device according to claim 1, further comprising a position adjustment driving section that adjusts a relative position of the 3D object being shaped with respect to the discharging head, wherein
    the discharging head includes a nozzle row in which a plurality of nozzles respectively discharging the material liquid droplet are lined in a nozzle row direction set in advance; and
    the position adjustment driving section adjusts the relative position of the 3D object being shaped such that a direction of relatively moving with respect to the discharging head becomes a direction orthogonal to the nozzle row direction at a timing when the 3D object being shaped passes a position facing the discharging head.

7. The shaping device according to claim 1, wherein the circling path is a path including a linear portion; and
    the discharging head discharges the material liquid droplet to the 3D object being shaped while the 3D object being shaped moves along the linear portion.

8. The shaping device according to claim 7, wherein
    the material of the 3D object is an ultraviolet curing type resin that cures by irradiation of an ultraviolet ray;
    the shaping device further comprises an ultraviolet light source that emits the ultraviolet ray;
    the circling path is a path further including a nonlinear portion; and
    the ultraviolet light source irradiates the 3D object being shaped with the ultraviolet ray while the 3D object being shaped moves along the nonlinear portion.

9. The shaping device according to claim 1, further comprising a 3D object rotation driving section that rotates the 3D object being shaped with a 3D object rotating shaft, which is a shaft parallel to the layering direction, as a center, wherein the 3D object rotation driving section rotates the 3D object being shaped by an angle set in advance in the middle of the operation of shaping to change a direction of the 3D object being shaped circling on the circling path.

10. The shaping device according to claim 9, wherein the 3D object rotation driving section rotates the 3D object being shaped by 180 degrees at a timing set in advance to interchange a region facing an inner circumferential side and a region facing an outer circumferential side of the circling path in the 3D object being shaped.

* * * * *